(12) United States Patent
Hoogendoorn et al.

(10) Patent No.: US 11,279,421 B1
(45) Date of Patent: Mar. 22, 2022

(54) BRACKETS AND METHODS FOR INSTALLING MODULAR, LIGHTWEIGHT LOAD-CARRYING PANELS AND RACKS ON AUTOMOBILES

(71) Applicant: Putco, Inc., Des Moines, IA (US)

(72) Inventors: Seth Hoogendoorn, Des Moines, IA (US); Conner Schramm, Des Moines, IA (US); Nicholas Niemeyer, Des Moines, IA (US); Matthew Thompson, Des Moines, IA (US); Parker Freeman, Des Moines, IA (US)

(73) Assignee: Puteo, Inc., Des Moines, IA (US)

( * ) Notice: Subject to any disclaimer, the term of this patent is extended or adjusted under 35 U.S.C. 154(b) by 0 days.

(21) Appl. No.: 17/390,434

(22) Filed: Jul. 30, 2021

(51) Int. Cl.
| | |
|---|---|
| *B62D 33/02* | (2006.01) |
| *B62D 33/023* | (2006.01) |
| *B60P 7/08* | (2006.01) |
| *B62D 65/16* | (2006.01) |
| *B60R 9/06* | (2006.01) |

(52) U.S. Cl.
CPC ........ *B62D 33/0207* (2013.01); *B60P 7/0815* (2013.01); *B60R 9/06* (2013.01); *B62D 33/023* (2013.01); *B62D 65/16* (2013.01)

(58) Field of Classification Search
CPC .. B62D 33/0207; B62D 33/023; B62D 65/16; B60R 2011/004; B60R 2011/0056; B60R 2011/0071; B60R 9/06; B60R 9/08; B60R 7/005; B60R 7/02; B60R 5/04; B60R 13/011; B60R 2013/016; B60P 7/06; B60P 7/08; B60P 7/0823

USPC .......................................................... 296/37.6
See application file for complete search history.

(56) References Cited

U.S. PATENT DOCUMENTS

| | | | |
|---|---|---|---|
| 5,724,707 A | 3/1998 | Kirk et al. | |
| 5,897,154 A | 4/1999 | Albertini et al. | |
| 6,481,604 B1 * | 11/2002 | Beene | B60R 9/00 |
| | | | 224/403 |
| 6,672,640 B2 | 1/2004 | Gehring et al. | |
| 6,948,732 B2 | 9/2005 | Amacker | |
| 7,413,231 B1 | 8/2008 | Wood et al. | |
| 7,819,295 B2 * | 10/2010 | Plavetich | B60P 3/07 |
| | | | 224/403 |
| 7,854,460 B2 | 12/2010 | Tweet et al. | |
| 8,052,019 B2 * | 11/2011 | Plavetich | B62D 25/2054 |
| | | | 224/403 |
| 8,496,146 B2 | 7/2013 | Badillo | |
| 8,657,542 B2 * | 2/2014 | Liu | B60P 7/0815 |
| | | | 410/106 |
| 8,998,253 B2 | 4/2015 | Novotny et al. | |
| 9,586,629 B2 | 3/2017 | Leitner | |
| 9,676,343 B2 | 6/2017 | Badillo | |
| D793,946 S | 8/2017 | Badillo | |
| 9,834,151 B2 * | 12/2017 | Henry | B60R 9/00 |
| D840,916 S | 2/2019 | Badillo | |
| 10,351,070 B2 | 7/2019 | Badillo | |
| 10,358,095 B1 | 7/2019 | Badillo | |

(Continued)

*Primary Examiner* — Gregory A Blankenship
(74) *Attorney, Agent, or Firm* — McKee, Voorhees & Sease, PLC

(57) ABSTRACT

A pickup full of gear doesn't have to be a jumbled mess. A modular, lightweight load-carrying system is custom engineered to fit directly to each make and model of pickups using the existing OEM mounting points in the bed. The rack systems allow pickup operators to keep gear organized, easily accessible, and secure.

19 Claims, 31 Drawing Sheets

(56) References Cited

U.S. PATENT DOCUMENTS

| | | | |
|---|---|---|---|
| 10,625,687 B1 * | 4/2020 | Todd | B62D 33/023 |
| 10,780,836 B1 * | 9/2020 | Fisher | B60R 9/02 |
| 10,875,459 B2 * | 12/2020 | Besley | B60R 7/08 |
| 10,933,796 B2 | 3/2021 | Beenen | |
| D924,122 S * | 7/2021 | Fisher | B60P 7/0815 |
| | | | D12/406 |
| 2004/0145206 A1 * | 7/2004 | Hicks | B60R 7/02 |
| | | | 296/37.16 |
| 2005/0249567 A1 * | 11/2005 | Cucknell | B60R 11/00 |
| | | | 410/56 |
| 2009/0014602 A1 * | 1/2009 | Frost | B60R 7/08 |
| | | | 248/100 |
| 2010/0043186 A1 * | 2/2010 | Lesley | B60P 7/0823 |
| | | | 24/68 CD |
| 2012/0132684 A1 * | 5/2012 | Ardigo | B60N 2/78 |
| | | | 224/545 |
| 2013/0037665 A1 * | 2/2013 | Brasell | E04H 4/14 |
| | | | 248/205.6 |
| 2017/0227141 A1 * | 8/2017 | Toll | F16L 3/23 |
| 2018/0264988 A1 * | 9/2018 | Johnson | B62D 33/02 |
| 2019/0092213 A1 * | 3/2019 | Beenen | B60R 7/00 |
| 2019/0219081 A1 * | 7/2019 | Hagedorn | F16B 5/0024 |
| 2019/0225166 A1 * | 7/2019 | Williams | B60R 11/06 |
| 2019/0337464 A1 * | 11/2019 | Cox | B60R 9/10 |
| 2021/0031841 A1 * | 2/2021 | Kananda | B62D 33/0207 |
| 2021/0114529 A1 * | 4/2021 | Chambers | B60R 9/06 |
| 2021/0138968 A1 * | 5/2021 | Cox | B62H 3/10 |

* cited by examiner

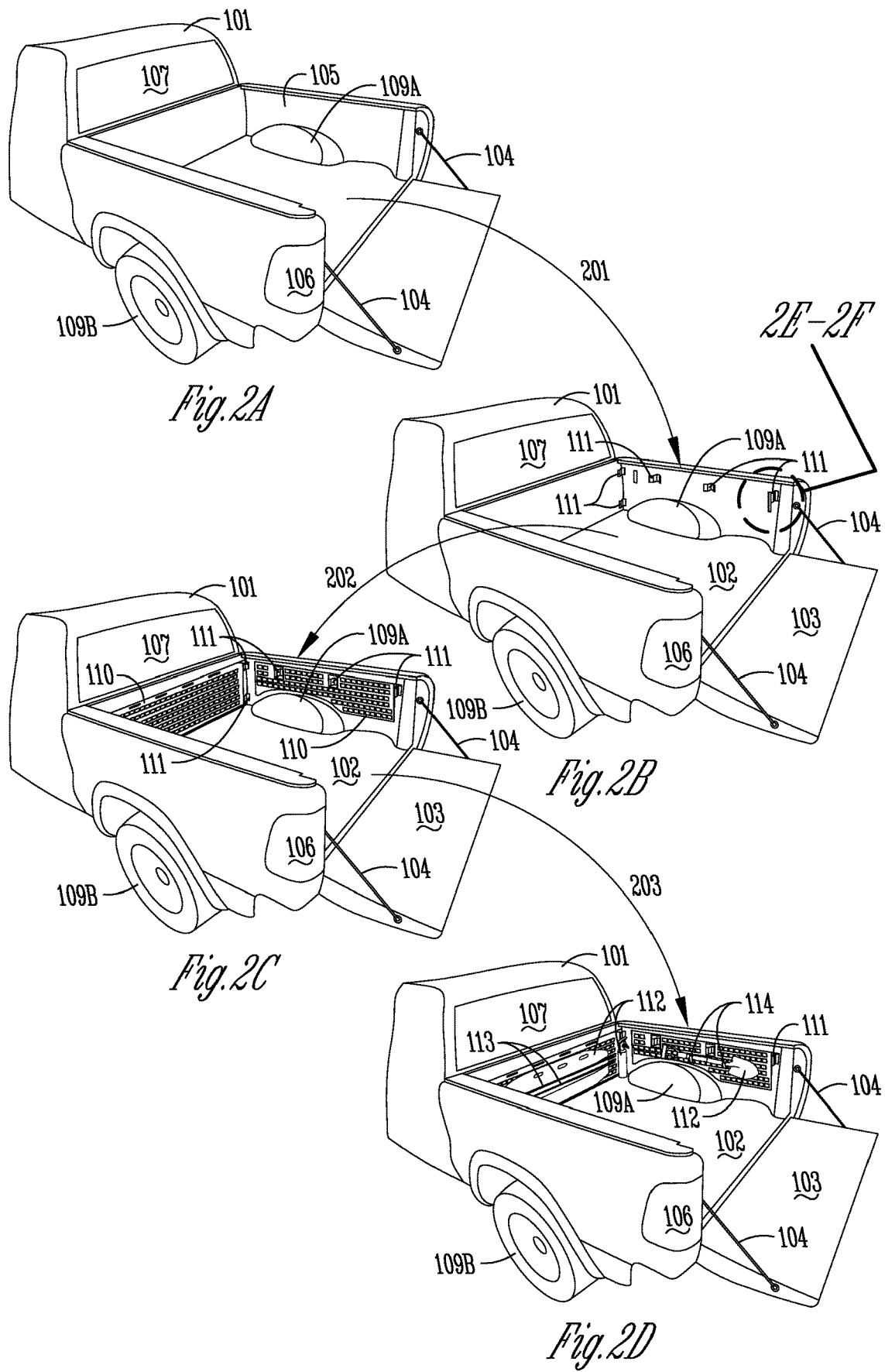

BRACKETS AND METHODS FOR INSTALLING MODULAR, LIGHTWEIGHT LOAD-CARRYING PANELS AND RACKS ON AUTOMOBILES

FIELD OF THE INVENTION

The present invention relates generally to an apparatus and/or corresponding method of use in at least the aftermarket, automotive accessories industry. More particularly, but not exclusively, the present invention relates to brackets and methods for installing modular, lightweight load-carrying panels and racks on automobiles, which, for example, can allow for the more secure mounting of cargo to the sidewall(s) of a truck bed.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Pickups are historically well suited for towing and hauling. The cargo bed can vary in size according to whether the vehicle is optimized for cargo utility or passenger comfort. Most have fixed side walls and a hinged tailgate. Cargo beds are normally found in two styles: step-side or fleet-side. A step-side bed has fenders which extend on the outside of the cargo area. A fleet-side bed has wheel-wells inside the bed. The exact placement of the wheel well thus vastly vary depending on the make and model of the pickup.

Construction and landscaping crews rely heavily on the use of pickups for everyday work. Pickups are the preferred vehicle because the separation of the bed from the crew can help keep dirt and other unwanted debris from entering the cab of the vehicle. Many of these pickup have beds that are full of gear at all times. As a result, the pickup bed looks like a jumbled mess. This is not usually the fault of the crew, as crews are unfathomably busy during the summer months.

In recent history, pickups have been used as light improvised fighting vehicles in military applications. Pickups are well-suited for such applications because of their versatility, four wheel drive, and open-backs. The open-back in particular allows for the mounting of a machine gun, anti-aircraft gun, rotary cannon, anti-tank weapon, anti-tank gun, ATGM, mortar, multiple rocket launcher, recoilless rifle or other support weapon, somewhat like a light military gun truck or potentially even a self-propelled gun. In such situations, the pickup is colloquially referred to as a "technical". In more professional terms, the pickup is referred to as a non-standard tactical vehicle ("NSTV").

Because the United States Department of Army ("the U.S. Army") has derived technological advances in military applications with inspiration from the automobile industry, it stands to reason that the automobile industry can advance technology by taking inspiration from military technology and, for example, applying said technology to advance the construction and landscaping industries. One such technology that has not be thoroughly explored is modular lightweight load-carrying equipment ("MOLLE") technology, first patented by the U.S. Army by way of U.S. Pat. No. 5,724,707. Such technology entered the public domain in 2016 and is thus ripe for improvement by private industry.

Modular ("MOLLE") is an item that replaced the aging all-purpose, lightweight, individual carrying equipment ("ALICE") pack. United States Marines report the modular load carriage system is more comfortable and durable. Specifically, MOLLE technology improved over ALICE by including a more robust frame. Instead of the tubular aluminum used with the ALICE, a new anatomically-contoured frame made with plastic originally used in automobile bumpers has dramatically increased durability, functioning in temperatures ranging from negative forty (−40) to one hundred twenty (120) degrees Fahrenheit (° F.). ALICE frames were known to break in airborne operations. This is because ALICE frames were known to crack after a single drop at thirty three feet per second (33 ft/s). MOLLE frames are capable of withstanding the same abuse fivefold without taking any damage.

Components of the MOLLE system developed by the United States Army are described as follows.

MOLLE advanced load-carrying abilities by introducing a new suspension system. Heavily-padded shoulder straps and a waist belt are adjustable for varying torso lengths, eliminating the two sizes of ALICE. The U.S. Army Research Institute of Environmental Medicine, located at Natick, assisted with biomechanical studies to find the most efficient way to carry loads and investigated the interaction between different load-carriage equipment and human performance. More weight is distributed at the shoulders and hips, and during a prolonged road march, soldiers can shift the weight to where it feels more comfortable.

The fighting load carrier ("FLC") of MOLLE replaced the load bearing equipment ("LBE") web belt and suspenders of ALICE, which better distributed weight across soldiers' torsos and significantly increased the amount of ammunition soldiers could carry. The MOLLE vest has no metal clips or hooks that can be awkward and dig into the skin, and has an H-harness in back to minimize heat buildup. The MOLLE vest is adjustable to all sizes, and because the vest sits high, soldiers can fasten the MOLLE frame waist belt underneath the FLC to distribute some of the load to the hips. Three flap pockets on the FLC each hold two 30-round magazines, two grenade pockets, and two canteen pouches.

The tactical assault panel ("TAP") later replaced the FLC The TAP is a bib-like chest rig that can be used alone or mounted on the improved outer tactical vest or solider plate carrier system. The TAP is covered with pouch attachment ladder system ("PALS") webbing and storage for up to eight rifle magazines (six 5.56 magazines+two 7.62 North Atlantic Treaty Organization ("NATO") magazines or eight 5.56 magazines).

Based on user feedback on the original system, the MOLLE requirements were modified to eliminate the need for a quick-release frame that integrates into the load-bearing vest. Spare buckles come with each MOLLE and are simple to replace.

The U.S. Army MOLLE also includes a rucksack with a front pocket to hold a claymore antipersonnel mine. A rucksack having two thousand cubic inches (2000 in$^3$) is referred to as an assault pack; a rucksack having three thousand cubic inches (3000 in$^3$) is referred to as a medium rucksack, is designed to be worn over body armor, supports loads up to sixty pounds (60 lbs), and features a large main compartment with internal dividers for items like the hydration system, 60 mm mortar rounds, along with a harness for ASIP radios; and a rucksack having four thousand cubic inches (4000 in$^3$) features a large main compartment with an internal divider between the upper and lower half for organizing loads, and includes some ALICE technology on the side to support legacy items such as the 2 quart canteen pouch. It is highly adjustable for comfort and load distribution. Two smaller compartments are located outside the main compartment. All packs are adorned in PALS webbing. Pouches of various utility that can be attached wherever PALS webbing exists. One type is a sustainment pouch. Other types of MOLLE pouches are commonly used to carry ammunition, gas masks, batons, flares, grenades, handcuffs and pepper spray, and custom pouches can include PALS-compatible pistol holders, hydration pouches and utility pouches. These pouches are normally secured through the use of straps, ALICE clips or speed clips. Inside the rucksack is a bandolier with a capacity for six (6) thirty (30) round magazines and a removable tactical radio pocket. A detachable sustainment pouch on each side is big enough to hold a ready to eat meal with room to spare. Underneath the rucksack, a sleeping bag compartment was designed to hold the Army's modular sleeping bag. Every U.S. Army MOLLE comes with a tube-delivered water pouch for on-the-move hydration to supplement the one-quart canteen.

All of the larger pouches of MOLLE, such as the outside rucksack pouches, have D-rings for carrying with a sling and use plastic see-through identification windows so soldiers don't have to marker or tape their name onto the MOLLE's camouflaged, urethane-coated nylon fabric. Each system comes with two 6-foot lashing straps for carrying large objects, such as a mortar plate or five-gallon containers. If one of the plastic buckles breaks, a repair kit carries a bag of spares for simple replacement.

The nylon mesh vest has removable pockets to accommodate different carrying needs and is one of the main components of the MOLLE system. Rifleman, grenadier, pistol, squad assault weapon gunner, and medic configurations of the fighting load carrier are examples of the versatility of the MOLLE.

Thus, there exists a need to advance the state of the art by implementing a secure, lightweight modular rack capable of carrying loads caused by cargo and other equipment for automobile applications, similar to how the military advanced the state of the art with respect to how soldiers carry gear on foot.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

It is a further object, feature, and/or advantage of the present invention to provide custom engineered rack systems that fit directly to each make and model using existing OEM mounting points in the bed.

It is still yet a further object, feature, and/or advantage of the present invention to organize, easily access, and secure gear.

It is still yet a further object, feature, and/or advantage of the present invention to utilize said modular lightweight racks with (1) other like modular lightweight racks, (2) other PALS components, (3) universal vehicle mounts for rifles and shotguns, and/or (4) other gear strapping systems to hold cargo in place on the roughest roads.

The modular, lightweight load-carrying panels and racks disclosed herein can be used in a wide variety of applications. For example, the modular, lightweight load-carrying panels and racks can be used for secure transportation, tactical applications, and/or to enhance the functional capabilities of the sidewall(s) of the truck bed.

It is preferred the apparatus be safe, cost effective, and durable. For example, the modular, lightweight load-carrying panels and racks can be adapted to resist thermal transfer and electric conductivity. Furthermore, the modular, lightweight load-carrying panels and racks can be adapted so as to more easily prevent failure (e.g., cracking, crumbling, shearing, creeping) due to being exposed to excessive and/or prolonged forces (e.g., tensile, compressive, and/or balanced forces).

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the present invention. Ornamental aspects of the embodiments provided herein can be specifically selected such that they best complement the make, model, year, and/or color of the vehicle. Such makes and models can, in non-limiting examples, comprise: Jeep Gladiator, Toyota Tacoma, Toyota Tundra, Ford Ranger, Ford F-150, Ford Super Duty, Nissan Frontier, Nissan Titan, Chevrolet Colorado, Chevrolet Silverado Light Duty ("LD"), Chevrolet Silverado Heavy Duty ("HD"), Dodge Ram LD, and Dodge Ram HD.

Methods can be practiced which facilitate use, manufacture, assembly, maintenance, and repair of the modular, lightweight load-carrying panels and racks which accomplish some or all of the previously stated objectives.

The modular, lightweight load-carrying panels and racks described herein can be incorporated into systems or kits which accomplish some or all of the previously stated objectives.

According to some aspects of the present disclosure, an interlocking attaching system for removably securing cargo to sidewalls of a truck bed of a pickup truck, said system comprises panels comprising a PALS grid, said panels including at least a front panel, driver-side panel, and passenger-side panel, a plurality of mounting brackets that secure said panels to existing mount points within the sidewalls of the truck bed, and fasteners for interlocking said cargo to the PALS grid of said panels, said fasteners including at least one strap and at least one clamp.

According to some additional aspects of the present disclosure, the fasteners further comprise at least one bracket or nylon ties.

According to some additional aspects of the present disclosure, at least a portion of a bottom edge of the driver-side panel or the passenger-side panel comprises a spline that corresponds to an upper edge of a wheel well of the truck.

According to some additional aspects of the present disclosure, the panels are coated with spray-on bed liners.

According to some additional aspects of the present disclosure, the front panel is symmetric about a vertical axis separating the driver-side and the passenger-side of the vehicle.

According to some additional aspects of the present disclosure, the panels provide clearance for factory tie downs and access to bedside outlets and lighting.

According to some additional aspects of the present disclosure, the panels include one or more cutouts in the panel that (1) avoid existing protrusions or obstructions in the sidewall of the truck bed or (2) permit access to electrical outlets or a wiring harness of the pickup truck.

According to some additional aspects of the present disclosure, the driver-side panel or the passenger-side panel comprises a duality of separate panels.

According to some additional aspects of the present disclosure, the panels comprise heavy gauge 1/10 inch thick 6000 series aluminum.

According to some additional aspects of the present disclosure, the panels are rated to carry a total weight of said cargo weighting at least two hundred pounds.

According to some additional aspects of the present disclosure, the panels are adapted to withstand temperatures between negative forty degrees and one hundred twenty degrees Fahrenheit.

According to some additional aspects of the present disclosure, the cargo is selected from the group consisting of weaponry, a spare battery, a tank for holding liquids, machinery, tools, equipment for construction or landscaping, and medical gear.

According to some additional aspects of the present disclosure, the at least one strap and the at least one clamp are made from a flexible, UV-resistant rubber.

According to some other aspects of the present disclosure, a method of using the interlocking attaching system comprises mounting the plurality of mounting brackets to the existing mount points; attaching the panels to said mounting brackets; and fastening cargo with the fasteners to said panels.

According to some additional aspects of the present disclosure, the method is free from drilling or cutting.

According to some additional aspects of the present disclosure, the method further comprises removing covers to access said existing mount points.

According to some additional aspects of the present disclosure, mounting said mounting brackets is accomplished by assembling the mounting brackets with a bolt, a washer, and a nut plate in succession, angling the nut plate such that the nut plate is behind an outer surface of the sidewalls, and tightening the bolt until the mounting plate is secured in place.

According to some additional aspects of the present disclosure, the method further comprises locating the at least one strap and the at least one clamp at desirable locations on the PALS grid.

According to some other aspects of the present disclosure, a method of manufacturing the interlocking attaching system of claim 1 comprising customizing the panels to a make and model of the pickup truck.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

FIGS. 2A-2F demonstrates a step-by-step method for installing brackets used to mount the modular, lightweight load-carrying panel system of FIG. 1 and use of same. More particularly, FIG. 2A illustrates a truck bed without any brackets or panels installed; FIG. 2B illustrates brackets installed in the truck bed; FIG. 2C illustrates brackets and panels installed in the truck bed; and FIG. 2D illustrates brackets and panels installed in the truck bed with cargo mounted thereto. FIG. 2E and FIG. 2F detail mounting the brackets to the truck bed.

FIG. 3A illustrates a first embodiment of a one-piece rubber clamp. FIG. 3B illustrates a second embodiment of a one-piece rubber clamp. FIG. 3C illustrates a third embodiment of a one-piece rubber clamp. FIG. 3D illustrates a fourth embodiment of a one-piece rubber clamp.

FIG. 4A shows a driver-side perspective view of the system; FIG. 4B show a rear perspective view of the system; FIG. 4C shows a perspective view of each of the panels within the system; FIG. 4D shows a detailed view of a front panel within the system; FIG. 4E shows a detailed view of a driver-side panel within the system; FIG. 4F shows a detailed view of a passenger-side panel within the system; and FIG. 4G shows a component view of the brackets within the system.

FIG. 5A shows a driver-side perspective view of the system; FIG. 5B show a rear perspective view of the system; FIG. 5C shows a perspective view of each of the panels within the system; FIG. 5D shows a detailed view of a front panel within the system; FIG. 5E shows a detailed view of a driver-side panel within the system; FIG. 5F shows a detailed view of a passenger-side panel within the system; and FIG. 5G shows a component view of the brackets within the system.

FIG. 6A shows a driver-side perspective view of the system; FIG. 6B show a rear perspective view of the system; FIG. 6C shows a perspective view of each of the panels within the system; FIG. 6D shows a detailed view of a front panel within the system; FIG. 6E shows a detailed view of a driver-side panel within the system; FIG. 6F shows a detailed view of a passenger-side panel within the system; and FIG. 6G shows a component view of the brackets within the system.

FIG. 7A shows a driver-side perspective view of the system; FIG. 7B show a detailed view of cargo within the system; FIG. 7C shows a perspective view of each of the panels within the system; FIG. 7D shows a detailed view of a front panel within the system; FIG. 7E shows a detailed view of a first driver-side panel within the system; FIG. 7F shows a detailed view of a first driver-side panel within the system; FIG. 7G shows a detailed view of a first passenger-side panel within the system; FIG. 7H shows a detailed view of a first passenger-side panel within the system; and FIG. 7I shows a component view of the brackets within the system.

FIG. 8A shows a driver-side perspective view of the system; FIG. 8B show a detailed view of cargo within the system; FIG. 8C shows a perspective view of each of the panels within the system; FIG. 8D shows a detailed view of a front panel within the system; FIG. 8E shows a detailed view of a driver-side panel within the system; FIG. 8F shows a detailed view of a passenger-side panel within the system; and FIG. 8G shows a component view of the brackets within the system.

FIG. 9A shows a driver-side perspective view of the system; FIG. 9B show a driver-side perspective view of cargo mounted to panels within the system; FIG. 9C shows a perspective view of each of the panels within the system; FIG. 9D shows a detailed view of a front panel within the system; FIG. 9E shows a detailed view of a driver-side panel within the system; FIG. 9F shows a detailed view of a passenger-side panel within the system; and there exists no view of the brackets within the system, as mounting brackets are not required in this embodiment.

FIG. 10A shows a driver-side perspective view of the system; FIG. 10B show a rear perspective view of the system; FIG. 10C shows a perspective view of each of the panels within the system; FIG. 10D shows a detailed view of a front panel within the system; FIG. 10E shows a detailed view of a driver-side panel within the system; FIG. 10F shows a detailed view of a passenger-side panel within the system; and FIG. 10G shows a component view of the brackets within the system.

FIG. 11A shows a driver-side perspective view of the system; FIG. 11B show a rear perspective view of the system; FIG. 11C shows a perspective view of each of the panels within the system; FIG. 11D shows a detailed view of a front panel within the system; FIG. 11E shows a detailed view of a driver-side panel within the system; FIG. 11F shows a detailed view of a passenger-side panel within the system; and FIG. 11G shows a component view of the brackets within the system.

FIG. 12A shows a driver-side perspective view of the system; FIG. 12B show a rear perspective view of the system; FIG. 12C shows a perspective view of each of the panels within the system; FIG. 12D shows a detailed view of a front panel within the system; FIG. 12E shows a detailed view of a driver-side panel within the system; FIG. 12F shows a detailed view of a passenger-side panel within the system; and FIG. 12G shows a component view of the brackets within the system.

An artisan of ordinary skill in the art need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

Figure 1:
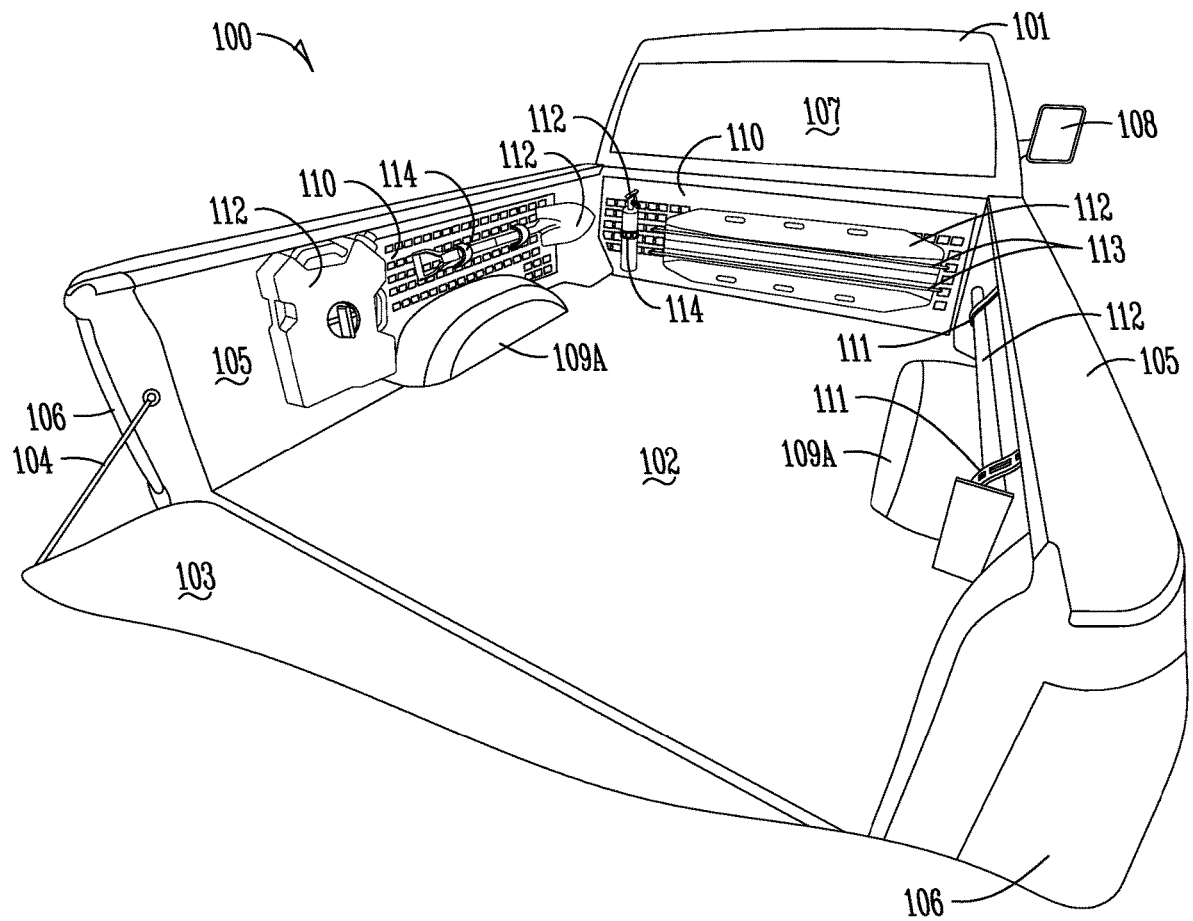
FIG. 1 shows an environmental perspective view of a modular, lightweight load-carrying panel system.

Referring now to the figures, FIG. 1 shows a pickup truck 100 with a cab 101 and a bed 102. The bed 102 can be a short, standard, or long bed of any suitable make or model of pickup 100. Pickups 100 usually sit higher than normal cars so they are often equipped with running boards or side steps below the doors. This can make it much easier to get in and out of a pickup 100.

Just in front of the pickup truck bed 102, is the cabin or cab 101. The cab 101 is the portion of the pickup 100 that carries the driver (in the United States, left-side) of the pickup and any passengers (in the United States: right-side). Pickup cabs 101 can come in single cab (one full size row of seating), extended cab (two rows of seating, front row is full size, back row is not full size), and crew cab (two full size rows of seating) configurations. The cab 101 typically comprises a shell and is enclosed by a roof and side doors (anywhere from 2 to 4 doors), windows on all 4 sides, and typical vehicle interior parts. The vehicle interior parts can include seats, a dashboard, climate controls, driving controls (steering wheel, shifter, pedals, etc.), and the like.

The bed 102 of the pickup 100 typically includes a hauling surface, open-back, and/or box for hauling cargo 112. The bed 102 can be a standard pickup box, flatbed, or utility bed. The floor of the bed 102 is typically flat. The floor extends from a cab end of the bed 102 to a tailgate end of the bed 102 and from a passenger-side sidewall 105 to the driver-side sidewall 105. Most pickup beds 102 have solid round loops for tie down points in the corners to attach rope or ratchet straps to. This allows drivers to tie down and secure some types of cargo 112 being hauled by the pickup 100. The inside the bed 102 often comes from the factory with just a painted surface. When the bed gets used, this paint wears and so many beds 102 will have liner added to them. A bed liner protects the bed from being dinged or scratched up and keeps it looking aesthetically pleasing. Sometimes, the beds 102 will even include lockable storage boxes or other like cargo storing equipment on one or more sides of the bed 102.

To secure the tailgate 103 to the bed 102, some mechanical attachment exists therebetween. Additionally, a cable 104 can be employed to limit tailgate travel. The tailgate cable 104 can comprise a flexible metal. Additionally, one or more latch rods can be employed near the rear bumper under the back of the pickup bed 102 to control and/or resist a rate of lowering the tailgate 103. The latch rod can comprise a tailgate lock, curved bar, hydraulic strut, or the like. Latch rod(s) are typically attached to the pickup frame or chassis near the rear end of the sidewalls 105, though could also be permanently attached to the tailgate 103. When the tailgate 103 is closed, latch rod(s) latch shut and can be locked to keep the bed 102 secure. The front wall next to the cab is often called a bulkhead.

The sidewalls 105 confine the space of the pickup bed 102. The top of the sidewalls 105 have reinforced railing known as bed rails. The bed rails can support weight to install many different accessories like caps & covers to close in the bed 102, racks for hauling larger & longer items, and the like. The sidewalls 105 help contain the cargo 112 within so the cargo 112 does not fall off onto the road during transport.

All pickup beds 102, regardless of the type, will contain a set of tail lights 106 at the rear corners of the sidewalls 105. Each of these lights 106 will contain a brake light, turn signals or blinkers, reverse lights, and tail lights that turn on when the parking lights or headlights are turned on.

Conspicuity for the rear of a vehicle is provided by the tail lights 106. These are required to produce only red light and to be wired such that they are lit whenever the front position lamps are lit, including when the headlamps are on. Tail lights 106 may be combined with the vehicle's other stop lights and/or be separate from them. In combined-function installations, the tail lights 106 produce brighter red light for the stop lamp function and dimmer red light for the rear position lamp function. Regulations worldwide typically stipulate minimum intensity ratios between the bright (stop) and dim (rear position) modes, so that a vehicle displaying rear position lamps will not be mistakenly interpreted as showing stop lamps, and vice versa.

The bulkhead includes back glass 107. The back glass 107 also called rear window glass, rear windshield, or rear glass, is the piece of glass opposite the windshield in the pickup 100. Back glass 106 can be made from tempered glass, also known as safety glass, which when broken will shatter into small, round pieces. This can be different from a front windshield, which is made of laminated glass, glass which consists of two pieces of glass, with vinyl therebetween.

There will also be a set of side view mirrors 108 attached to the front doors. Many pickup trucks 100 will be equipped with over-sized towing mirrors to be able to see around the wide trailers they often tow.

Cargo beds 102 are normally found in two styles: stepside or fleet-side. A step-side bed has fenders which extend on the outside of the cargo area. A fleet-side bed has wheel-wells 109A inside the bed 102, under the wheels 109B that support the pickup 100 are located. The wheel 109B, as a non-limiting example, can comprise an off-road tire and/or all-terrain tires. Off-road tires employ deep tread to provide more traction on unpaved surfaces such as loose dirt, mud, sand, or gravel. Compared to ice or snow tires, off-road tires lack studs but contain deeper and wider grooves meant to help the tread sink into mud or gravel surfaces.

Many embodiments of the aftermarket, modular, lightweight panels 110 and racks are described herein. The panels 110, in connection with mounting brackets 111, are a means through which cargo 112 can be stored, secured, and/or organized within the truck bed 102 during transport. The cargo 112 can include weaponry, a spare battery, a tank for holding liquids, machinery, tools, equipment for construction or landscaping, medical gear, or any other object wished to be transported by the driver and/or passengers of the pickup 100.

The panels 110, in particular are laser cut with laser optics and computer numerical control ("CNC cut"). The panels 110 are preferably cut from heavy gauge $\frac{1}{10}$ inch thick 6000 series aluminum, such that the panels 110 are lightweight and substantially rustproof. In some embodiments, the panels 110 are designed to carry a maximum distributed load of 200 lbs, and are thus not meant to be used as a tie down point for objects having greater weight than this. During use, the panels 110 are recessed completely from a top edge of the sidewalls 105, and are thus compatible with bed cover. Moreover, the panels 110 typically include a black minitexture powder coat finish, but can also be sprayed with bed liners and/or be adapted so as not to damage existing bed liners. The panels 110 can be provided separately or in groups to allow for maximum customization. The panels 110 can include driver-side, passenger-side, and cab-side (front) panels. Each panel of the panels 110 is custom fit designs engineered for every make and model and makes for the perfect addition for over-landing builds. The panels 110 can also be configured to provide clearance for factory tie downs and access to bedside outlets and lighting. The panels 110 allow for keeping gear organized, easily accessible, and secure while maximizing bed space. The panels 110 can be complemented with other modular lightweight load-carrying panels, pouch attachment ladder systems, aftermarket clamps and fasteners 114, and many other gear strapping systems 113 that hold cargo 112 in place on the roughest roads. The fasteners 114 can comprise clamps, ties, cables, screws, nuts, bolts, pins, rivets, staples, washers, grommets, latches (including pawls), ratchets, clasps, flanges, adhesives, welds, or any combination thereof may be used to facilitate fastening.

The Putco truck bed Molle panels have an easy, no-drill installation that uses the existing OEM mounting points in the existing bed 102. The panels provide clearance for factory tie downs and access to bedside outlets and lighting, so that the driver is not giving up any functionality. To install and use the panels 110, the installation, mounting, and use steps in FIGS. 2A-2D can be followed. For example, installation can be accomplished by the driver in less than an hour.

Figure 2E:
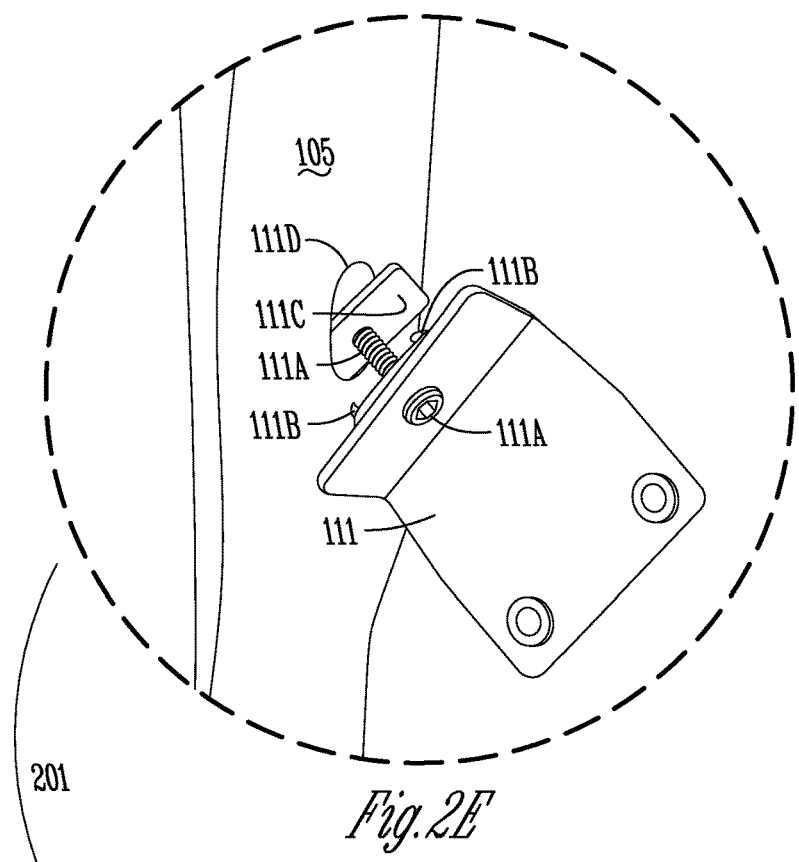
Figure 2F:
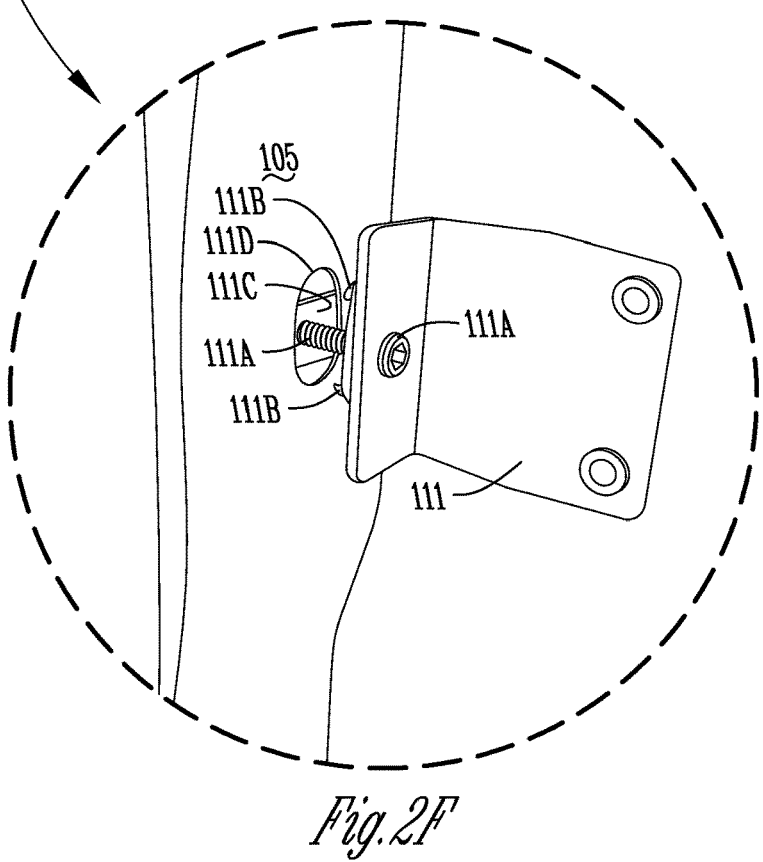

In some embodiments, to mount 201 the brackets 111 to the truck bed 102, the installer starts by loosely assemble the brackets 111 by combining a bolt 111A, tabbed washer 111B, and nut plate 111C. The bolt 111A can be put through the bracket 111 first, then the tabbed washer 111B, and finally the nut plate 111C, as shown in FIGS. 2E-2F. The assembled bracket 111 can then carefully be placed at an angle and inserted into existing OEM mount points (e.g. an oval hole 111D) in the bed 102, provided any plastic covers that come with the vehicle have already been removed, as shown in FIGS. 2E-2F. Once the nut plate 111C is placed perpendicularly within the existing OEM mount point, the installer can use their hands to hold the bracket 111 in place, while using the appropriate screwdriver (such as a hex key) to securely tighten the brackets 111. Usually, where more than one bracket 111 is being employed, the installer should refrain from completely tightening all of the brackets 111 in place until the process of tightening has been started for all brackets 111. Second, to attach 202 the panels 110 to the brackets 111, the panels 110 can simply be screwed on such that the panels 110 are in a properly mounted position. Third, the installer can secure 203 tools, gear, or other objects and equipment can with fasteners 114.

Specific examples 114A-D of said fasteners 114 are shown by way of FIGS. 3A-3D. More particularly, these particular fasteners are made from UV-resistant rubber and are thus very versatile. All include a base portion 301, but differ in terms of how they achieve securement. Choice of the preferred fastener 114A-114D depends on the application of same.

Figure 3A:
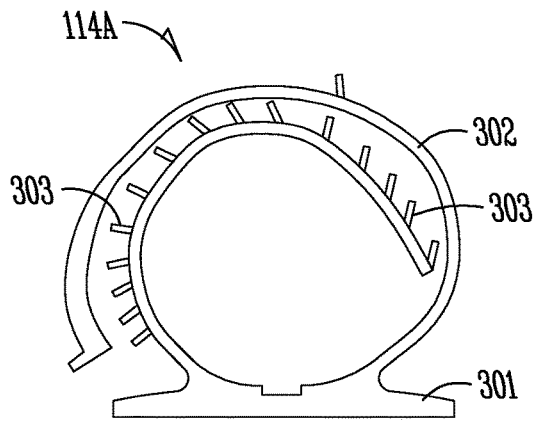
FIGS. 3A-3D show various accessories that can be used with modular, lightweight load-carrying panels of FIG. 1. More particularly.

The embodiment 114A of FIG. 3A, for example, utilizes two flexible arms 302 having teeth 302 to facilitate securement. This embodiment 114A can hold objects from 2.5" to 9.5" in diameter. Each clamp 114A supports a safe working load of at least fifty pounds (50 lbs). This fastener 114A can mounts with three #10 bolts or screws and the mounting area of this fastener 114A is 6"×⅞".

Figure 3B:
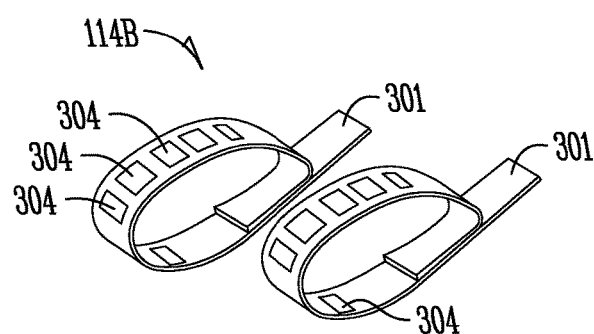

In the embodiment 114B of FIG. 3B, several notches 304 are placed uniformly throughout the fastener 114B such that the installer can select a varied width to tightly encompass any cargo 112. This embodiment 114B can hold objects from ½" to 4.5" in diameter. Each clamp 114B supports a safe working load of fifty pounds (50 lbs). The break strength of this fastener 114B Break strength is one hundred twenty pounds (120 lbs). The fastener 114B mounts easily with two ¼" bolts or #14 wood or sheet metal screws, plus washers.

Figure 3C:
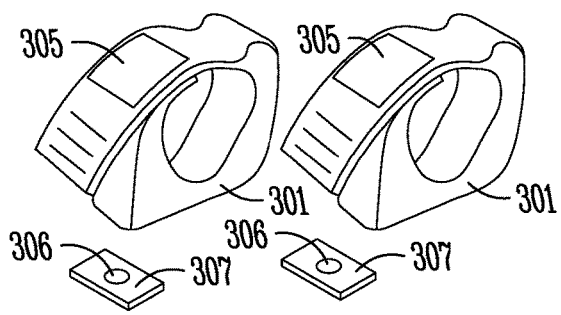

In FIG. 3C, additional washer plates 307 with central holes 306 can be used in connection with a large rectangular aperture 305 to facilitate securement. This embodiment 114C can hold objects from 1" to 2.25" in diameter. Each clamp 114C supports a safe working load of at least twenty five pounds (25 lbs). This fastener 114C can mounts with one #10 bolt or screws and the mounting area of this fastener 114C is 2¾"×⅞".

Figure 3D:
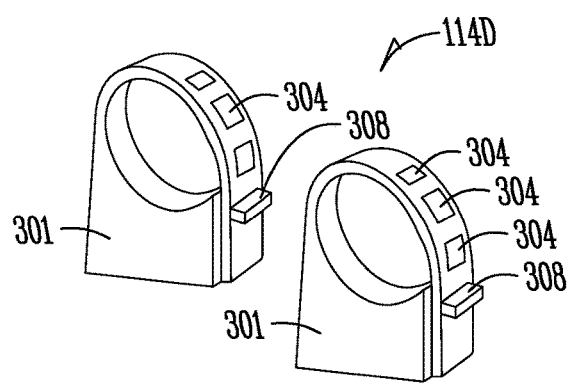

In FIG. 3D, a locking tab 308 is included to facilitate securement to the notches 304. This embodiment 114D can hold objects from ½" to ⅞" in diameter. Each clamp 114D supports a safe working load of at least twenty thirteen pounds (13 lbs). This fastener 114D can mounts with one #6 flathead screw and the mounting area of this fastener 114D is 1⅜"×1⅛".

Detailed aspects of the panels 110 and brackets 111 can be seen throughout the rest of the figures, with each numeric portion of the alphanumeric string denoting a distinct make and model of the vehicle.

In greater particularity, FIGS. 4A-4G show modular, lightweight load-carrying panels that include a panel flange 401, holes 402 in the panel flange 401, elongated slots 403 in a main body portion of the panel 110, a PALS grid 404, a recessed surface 405 that connects the panel flange 401 and the main body portion of the panel 110, and holes 406 in the main body portion of the panel 110, through which bolts and screws can be inserted. In such an embodiment, the bottom edge of the driver-side panel 400C and passenger-side panel 400B comprises a splined edge 407 that tracks the wheel well 109A of a Jeep Gladiator. At a rear end of the said panels 400B, 400C, a cutout with a substantially orthogonal angle 409 exists to give some clearance for tow hooks and/or a power outlet toward the rear of the bed 102. The front panel 400A is shown as symmetrical about the line of symmetry 408.

Figure 4A:
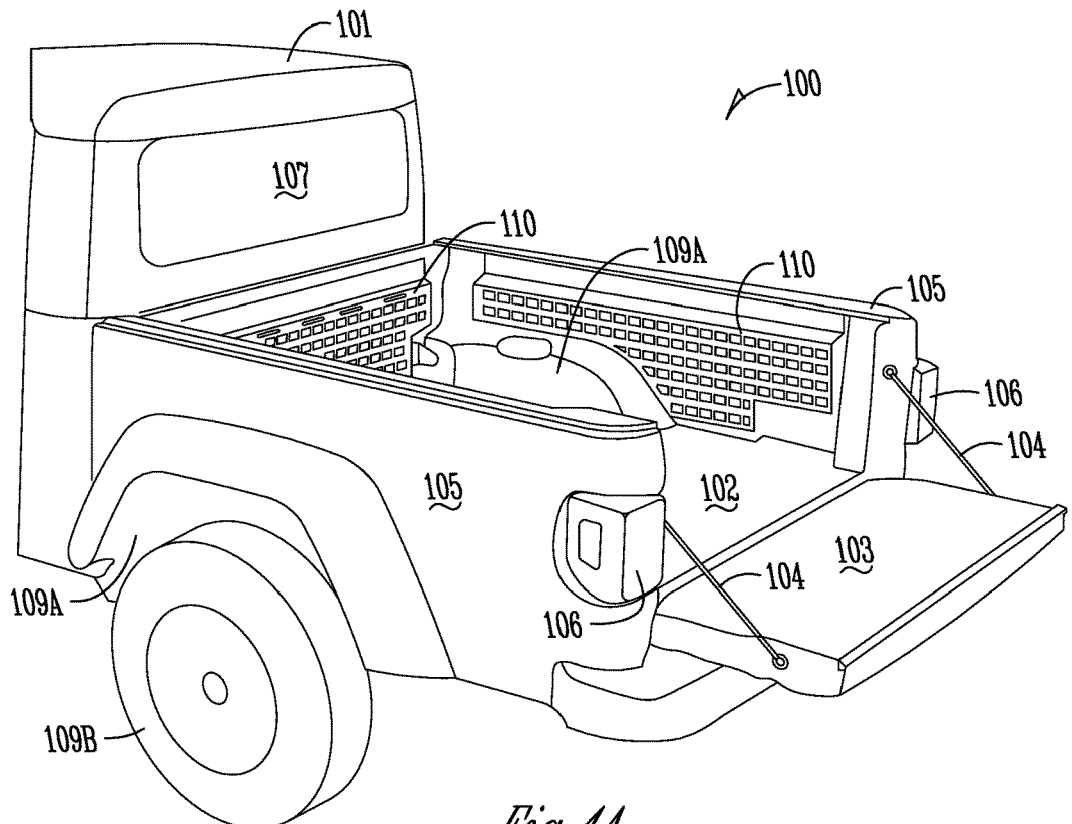
FIGS. 4A-4G exemplify one potential embodiment of the modular, lightweight load-carrying panel system, said embodiment being specifically designed for a Jeep Gladiator. More particularly.
Figure 4B:
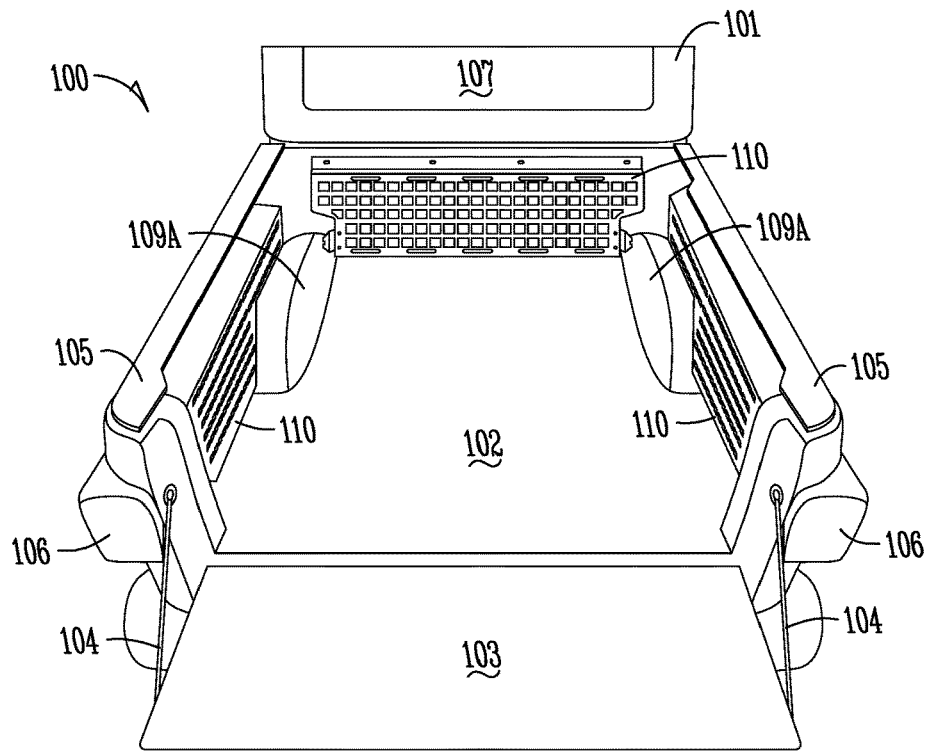
Figure 4C:
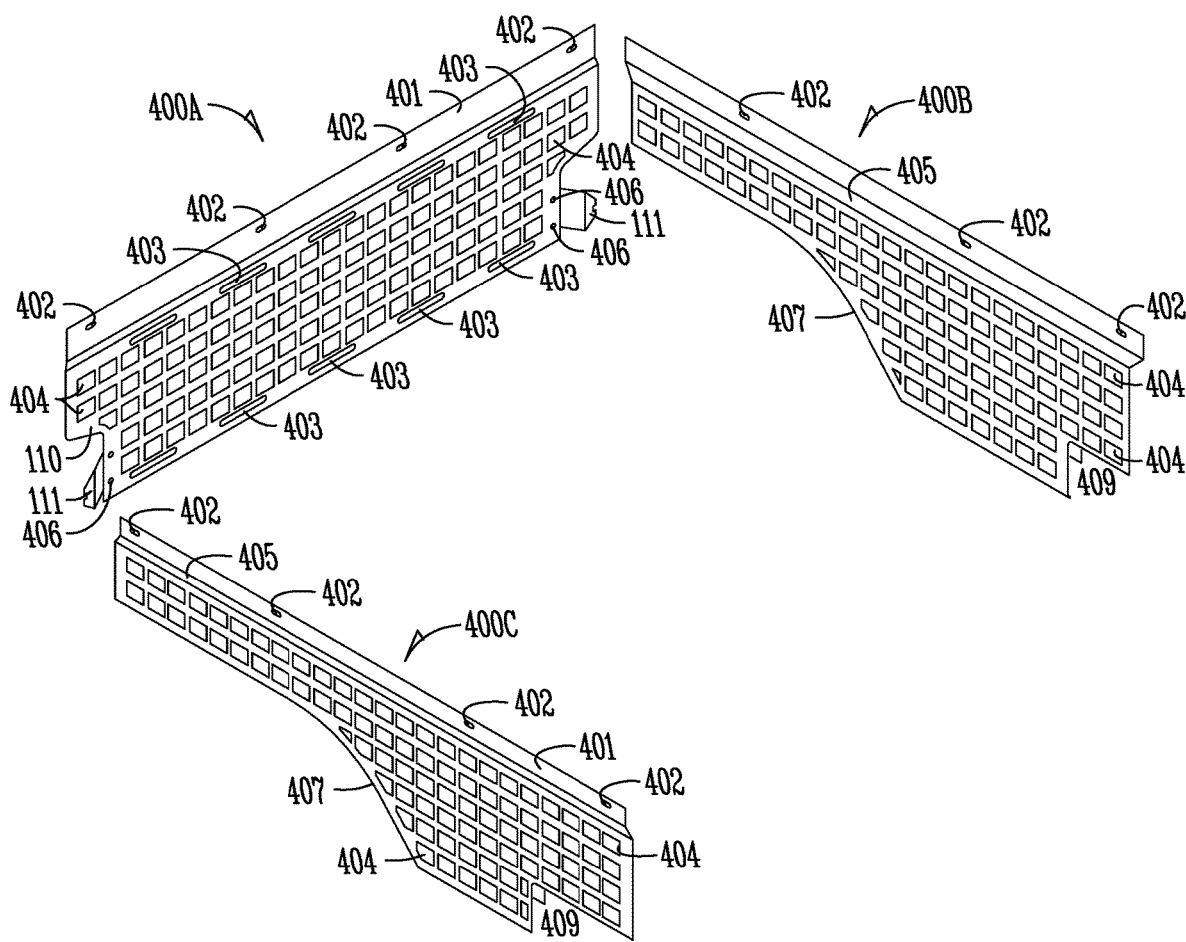
Figure 4D:
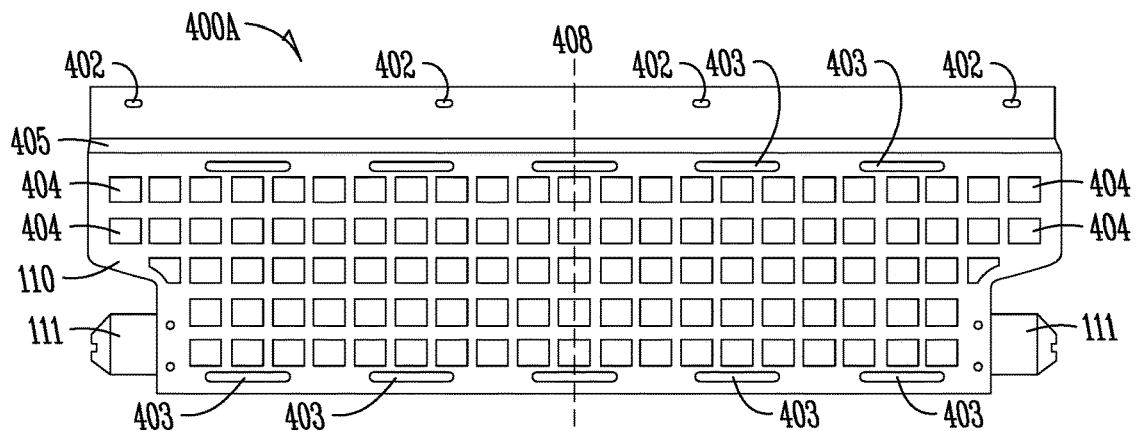
Figure 4E:
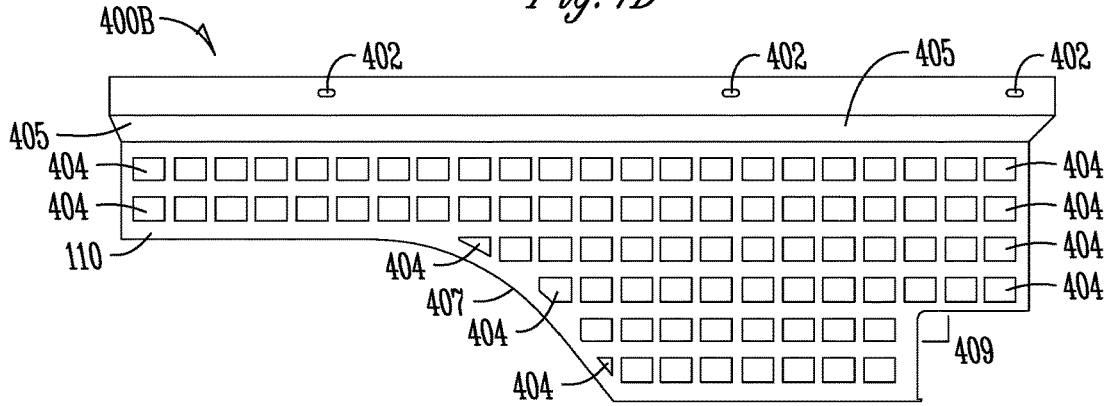
Figure 4F:
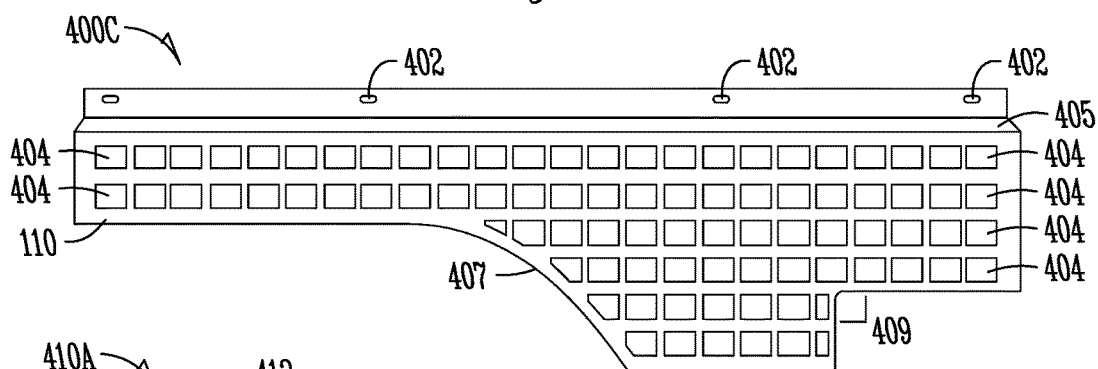
Figure 4G:
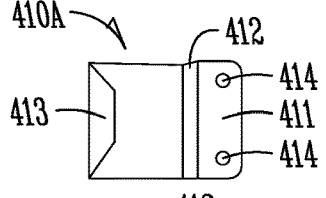
Figure 4G:
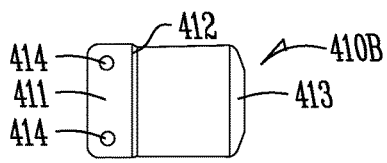

FIG. 4G, in particular, shows a first front bracket 410A, a second front bracket 410B, first bracket flange 411, a protruding surface 412 separating a main body portion of the bracket 111 from the first and second bracket flanges 411, 413, the second bracket flange 413, and bracket hole(s) 414, through which bolts and screws can be inserted.

Regarding a method of installation for the panels 400A, 400B, 400C of this particular embodiment, exemplary and enumerated installation instructions follow:

1. unscrew and remove all in-bed rails (Gladiator rails are attached with T30 Torx-head bolts);
2. unscrew and remove all tie-down hooks using a T40 Torx driver, place the second front brackets 410B behind the tie-down hooks, then fasten to the bed 102 re-using factory hardware;
3. loosely assemble a jam nut onto each of the rubber feet then screw the feet into the nutserts located on the bottom flange of the panels 400B, 400C (rubber feet are not always used);
4. place the panels 400A, 400B, 400C on the backside of the in-bed rails, then fasten to the bed 102 re-using the factory hardware (note: if the Gladiator did not come equipped with in-bed rails, the panels 400A, 400B, 400C can be bolted to the bed rail mounting holes with extra M6 bolts;
5. fasten the panels 400A, 400B, 400C to the corresponding brackets 410A, 410B using the M6 bolts and a T30 Torx driver;
6. adjust rubber feet on the panels 400B, 400C down until they are snug against the floor of the bed 102 then secure the rubber feet in place by tightening the jam nuts against the nutserts using a 10 mm wrench; and
7. once all the panels 400A, 400B, 400C are installed in the vehicle, ensure all fasteners are tightened until snug, but do not overtighten.

FIGS. 5A-5G show modular, lightweight load-carrying panels that include a panel flange 501, holes 502 in the panel flange 501, elongated slots 503 in a main body portion of the panel 110, a PALS grid 504, a recessed surface 505 that connects the panel flange 501 and the main body portion of the panel 110, and holes 506 in the main body portion of the panel 110, through which bolts and screws can be inserted. In such an embodiment, the bottom edge of the driver-side panel 500B and passenger-side panel 500C comprises a splined edge 507 that tracks the wheel well 109A of a Toyota Tacoma. The front panel 500A includes a pair of rectangular panel cutouts 509 that appear as notches along a top edge of the front panel 500A. The front panel 500A is shown as symmetrical about the line of symmetry 508.

Figure 5A:
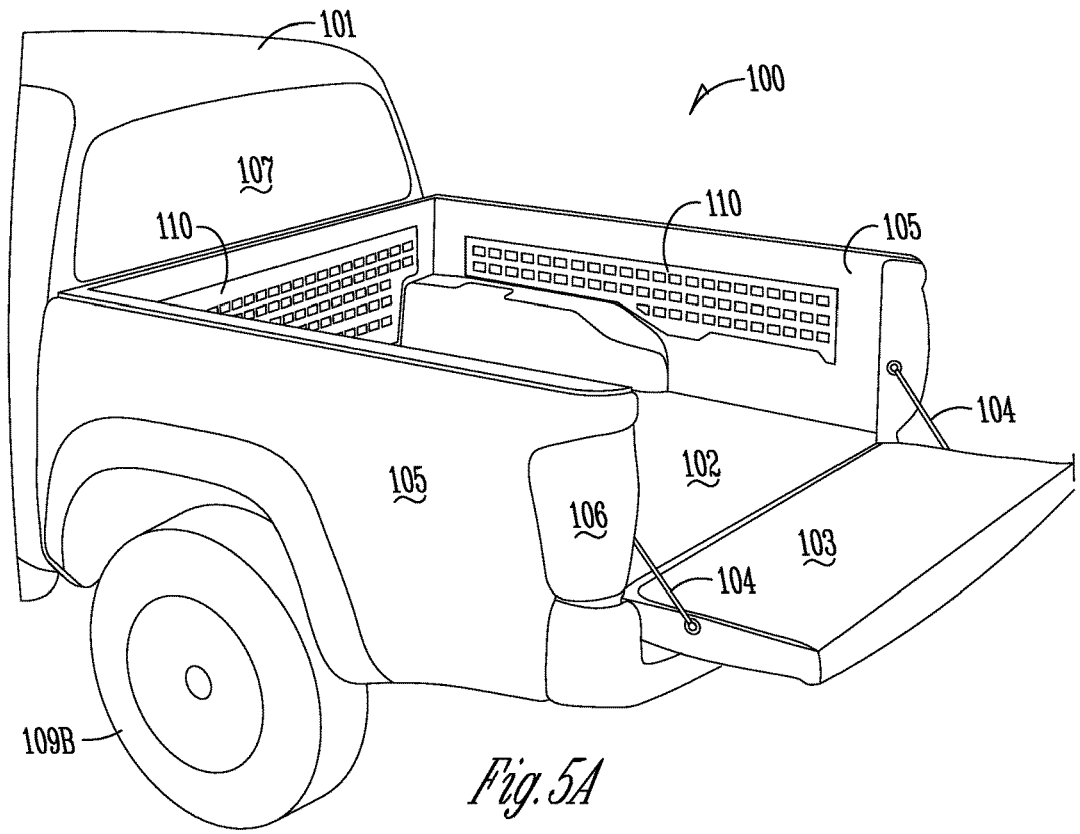
FIGS. 5A-5G exemplify one potential embodiment of the modular, lightweight load-carrying panel system, said embodiment being specifically designed for a Toyota Tacoma. More particularly.
Figure 5B:
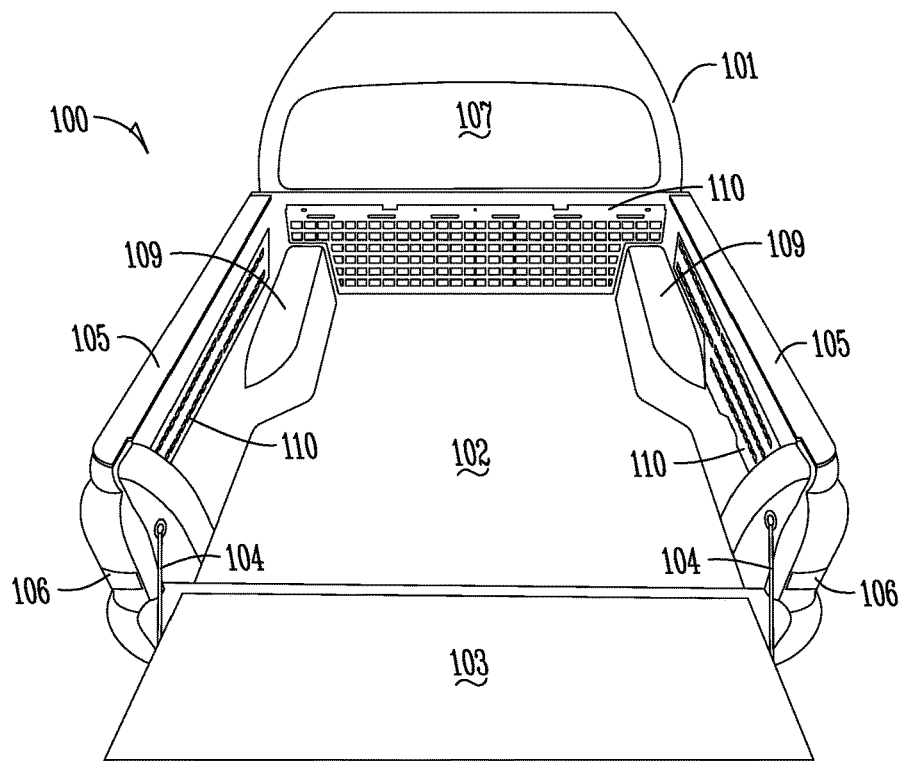
Figure 5C:
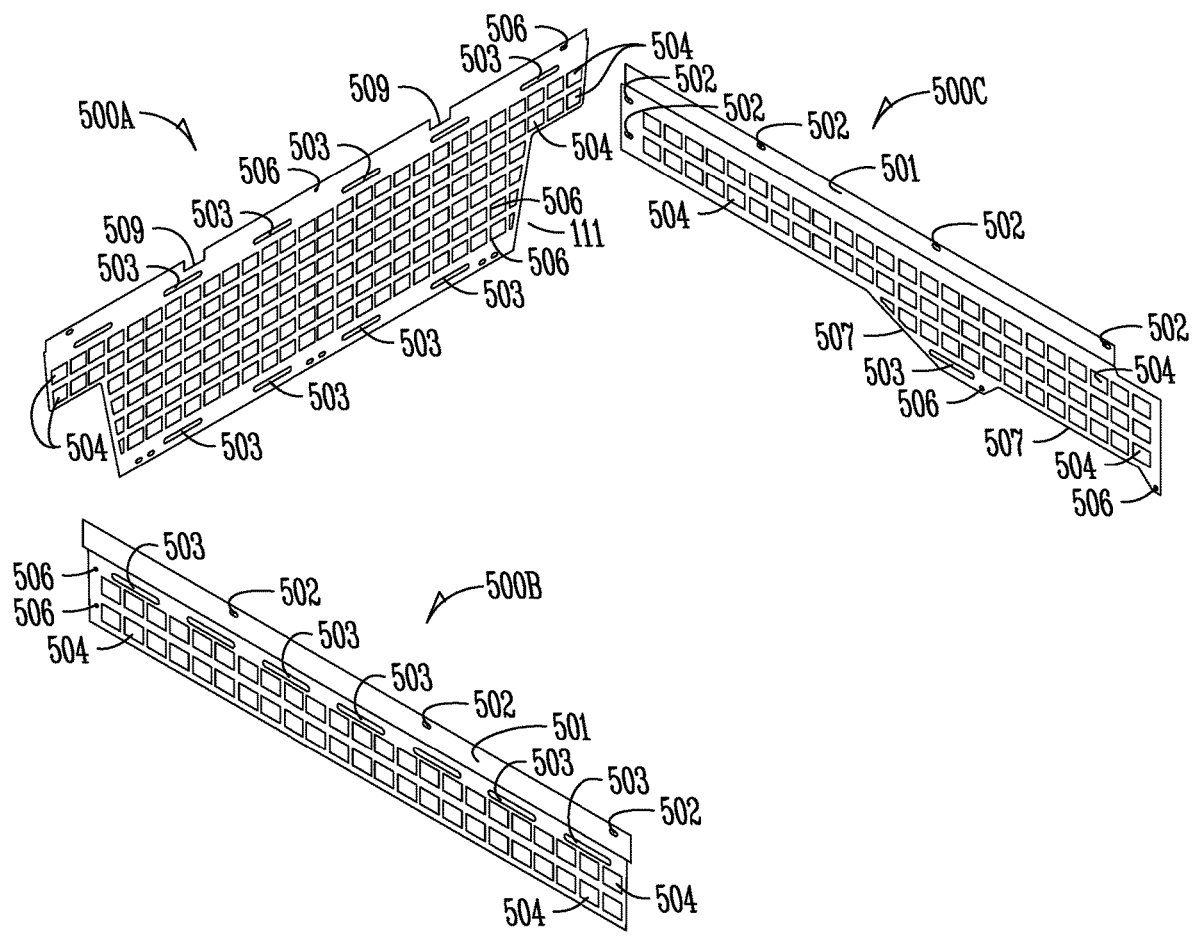
Figure 5D:
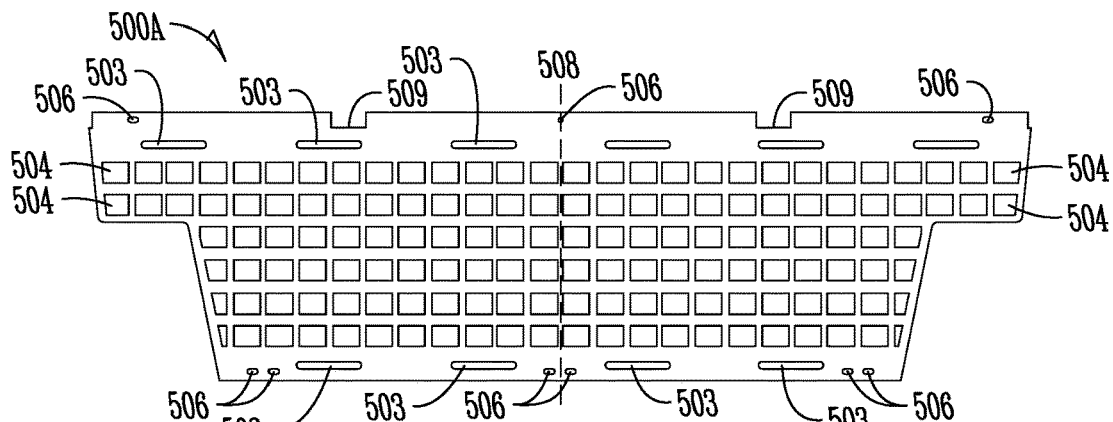
Figure 5E:
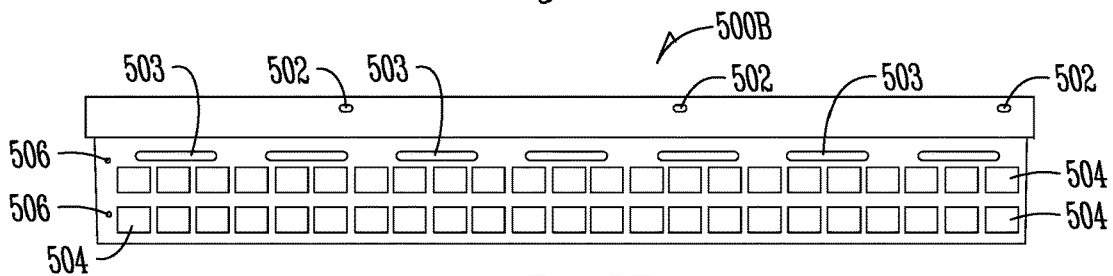
Figure 5F:
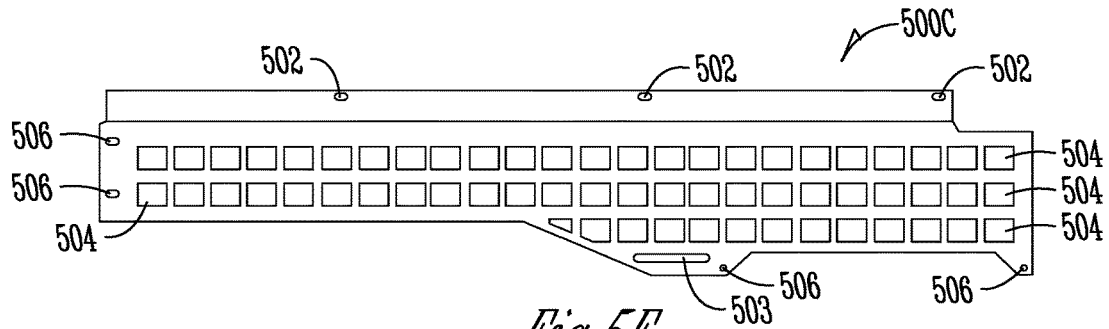
Figure 5G:
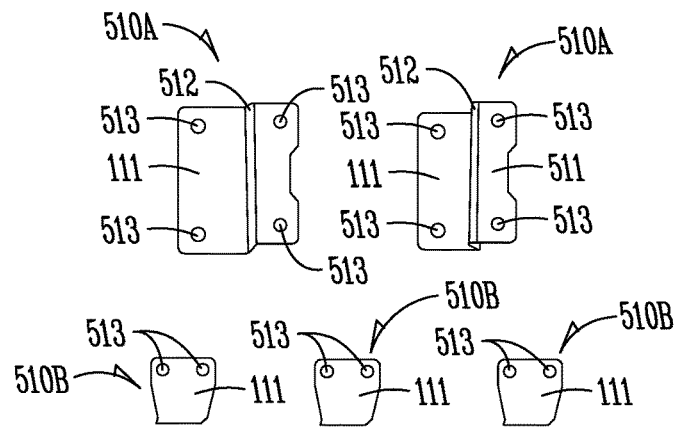

FIG. 5G, in particular, shows side bracket(s) 510A, front bracket(s) 510B, a bracket flange 511, a protruding surface 512 separating a main body portion of the bracket 111 from the bracket flange 511, and bracket hole(s) 513, through which bolts and screws can be inserted.

Regarding a method of installation for the panels 500A, 500B, 500C of this particular embodiment, exemplary and enumerated installation instructions follow:

1. unscrew and remove both in-bed rails using a T30 Torx driver;
2. using a T40 Torx driver, unscrew and remove the two tie-down hooks located towards the front of the bed 102, then place the side brackets 510A behind the tie-down hooks, then fasten to the bed 102 re-using factory hardware;
3. loosely assemble a well nut and Philip's-head screw onto each of the three front brackets 510B, then insert the well nuts down into each of the three drain holes located towards the front of the bed floor, and then tighten the screw until the well nut is snug in the hole (but do not overtighten);
4. remove and set aside the two T30 Torx-head fasteners from the passenger-side bed cubby, (the passenger-side panel 500C will mount to this location re-using these fasteners);
5. place the side panels 500B, 500C on the backside of the in-bed rails, then fasten to the bed 102 re-using the factory hardware;
6. unscrew and remove the three required T30 Torx-head fasteners from the upper part of the bed front, then set the front panel 500A in place, and attach to the bed re-using these three fasteners;
7. fasten the panels 500A, 500B, 500C to the corresponding brackets 510A, 510B using the M6 bolts and a T30 Torx driver; and
8. once all the panels 500A, 500B, 500C are installed in the vehicle, ensure all fasteners are tightened until snug, but do not overtighten.

FIGS. 6A-6G show modular, lightweight load-carrying panels that include a holes 602 in a main body portion of the panel 110, elongated slots 603 in a main body portion of the panel 110, a PALS grid 604, and a small notch 606 on the lower edge of a splined edge 607 on the driver-side panel 600B. In such an embodiment, the bottom edge of the driver-side panel 600B and passenger-side panel 600C comprise a splined edge 607 that tracks the wheel well 109A of a Ford Ranger and substantially rectangular shaped cutouts 609 (with slight bulges appearing on the left-hand and right-hand sides of said substantially rectangular cutouts) internally located within the main body portion of the panels 600B, 600C. The front panel 600A is symmetrical about the line of symmetry 608.

Figure 6A:
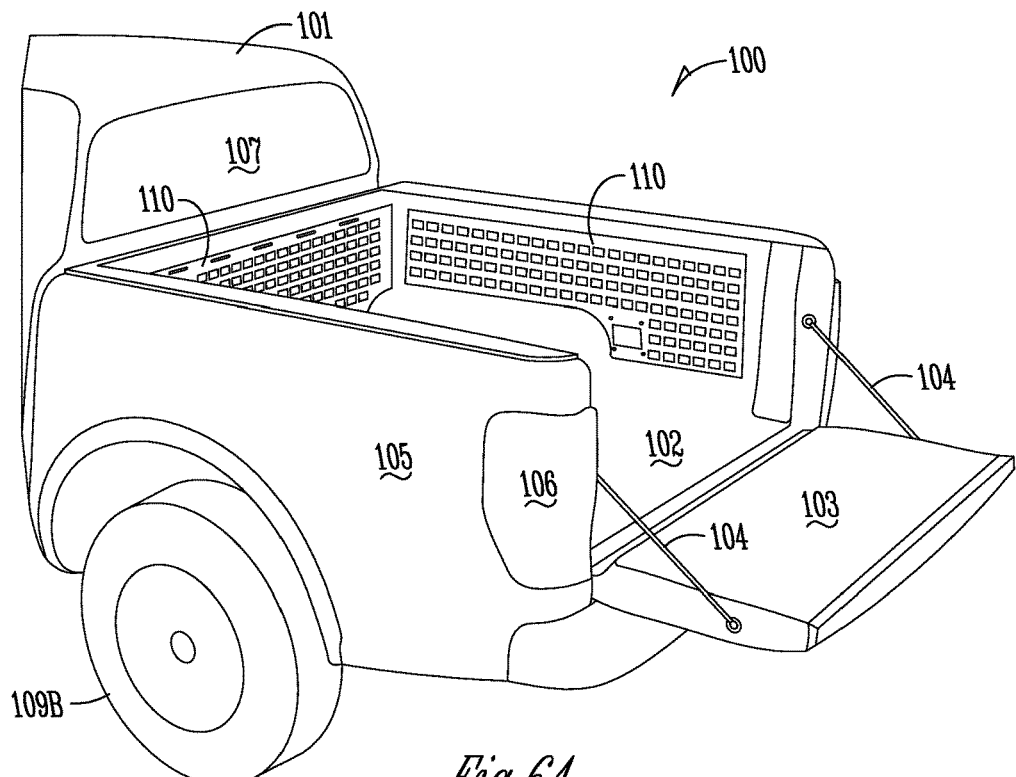
FIGS. 6A-6G exemplify one potential embodiment of the modular, lightweight load-carrying panel system, said embodiment being specifically designed for a Ford Ranger. More particularly.
Figure 6B:
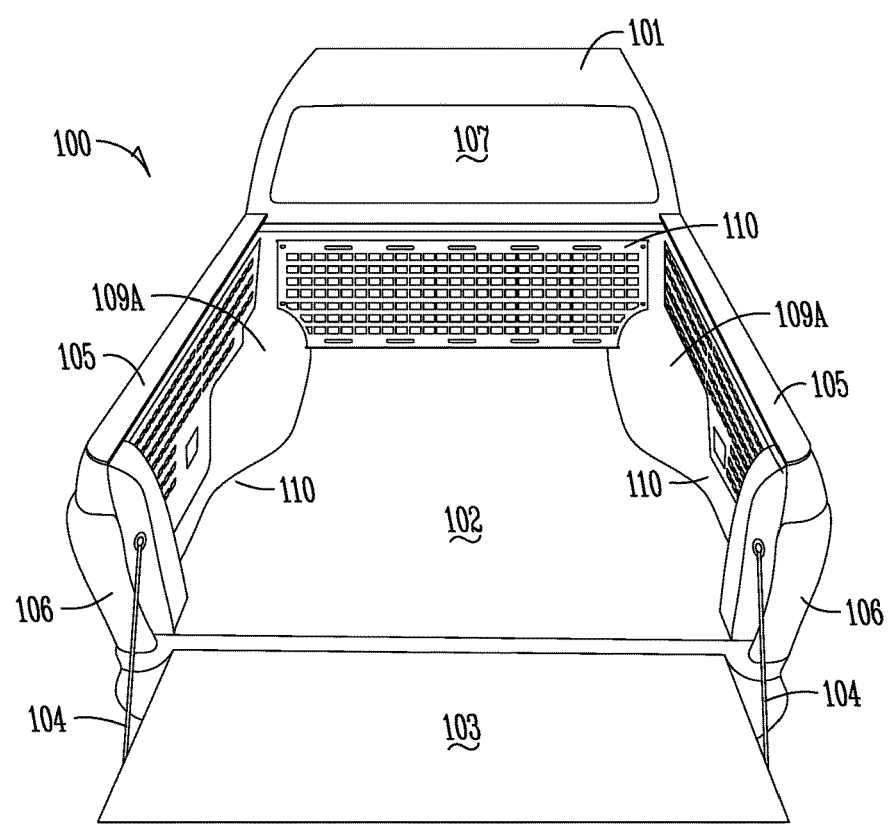
Figure 6C:
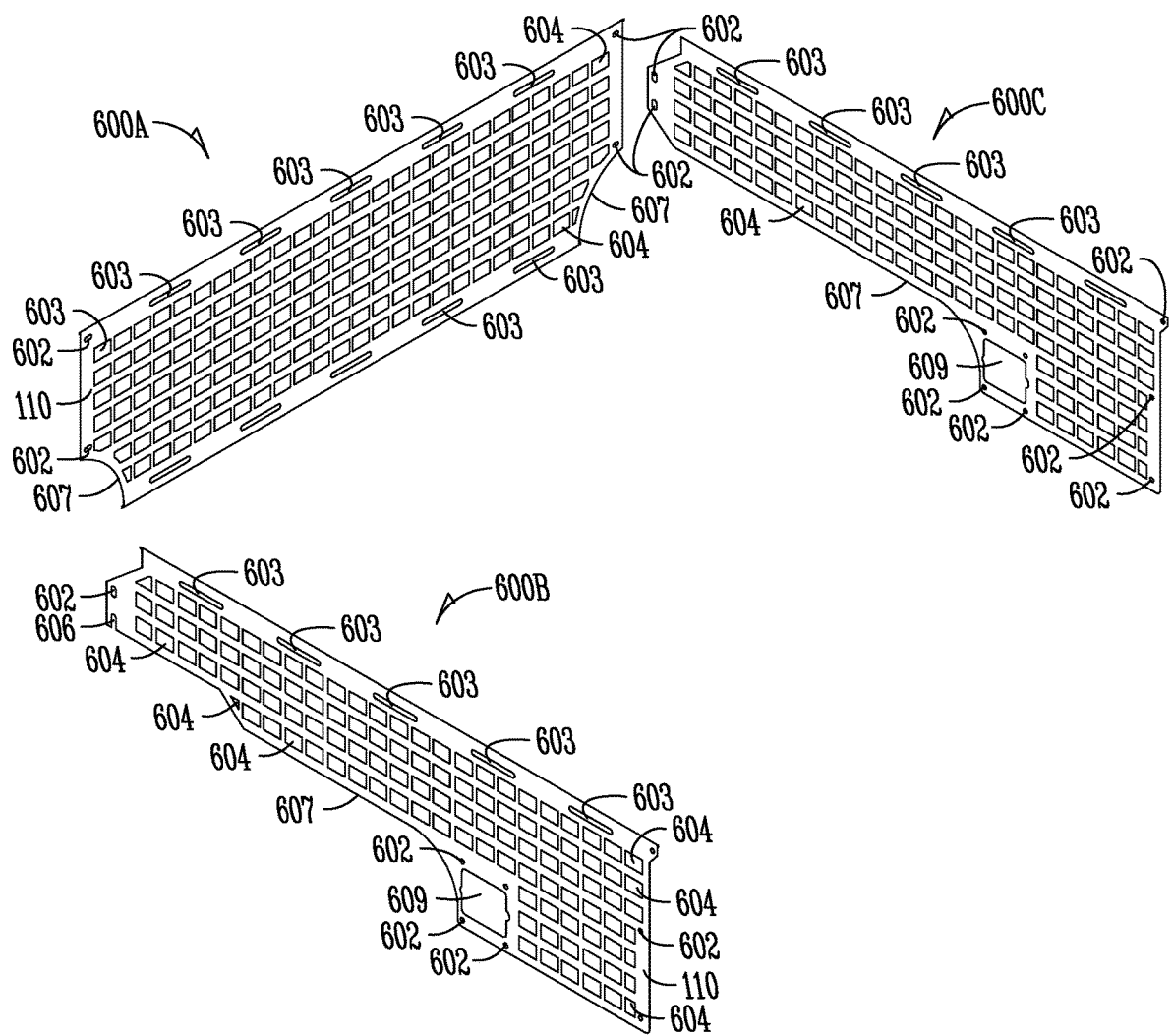
Figure 6D:
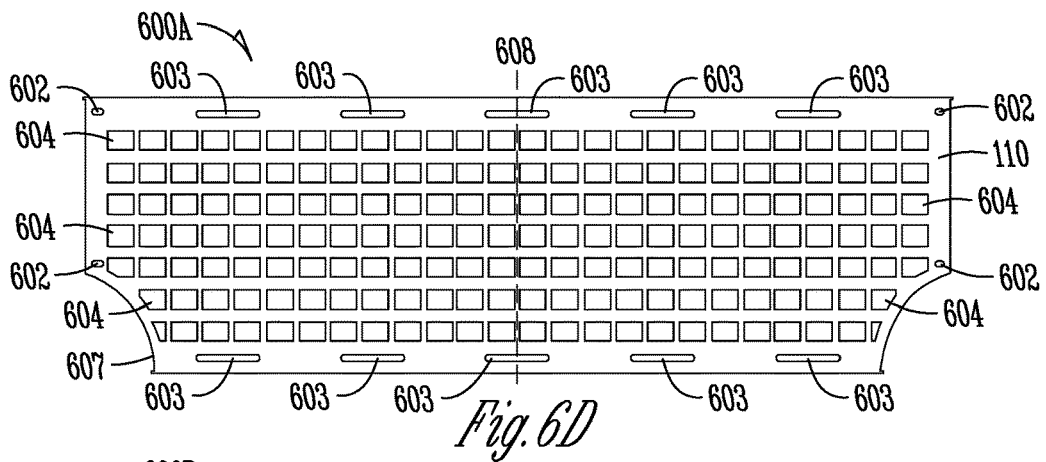
Figure 6E:
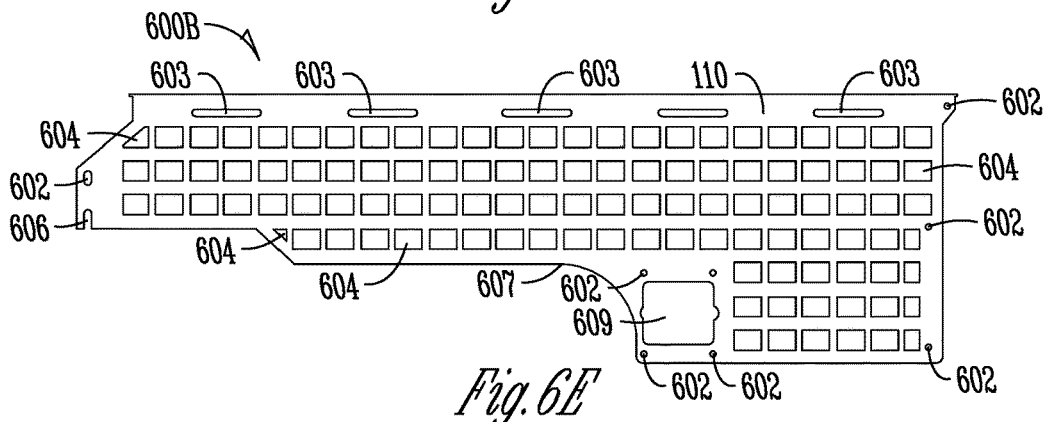
Figure 6F:
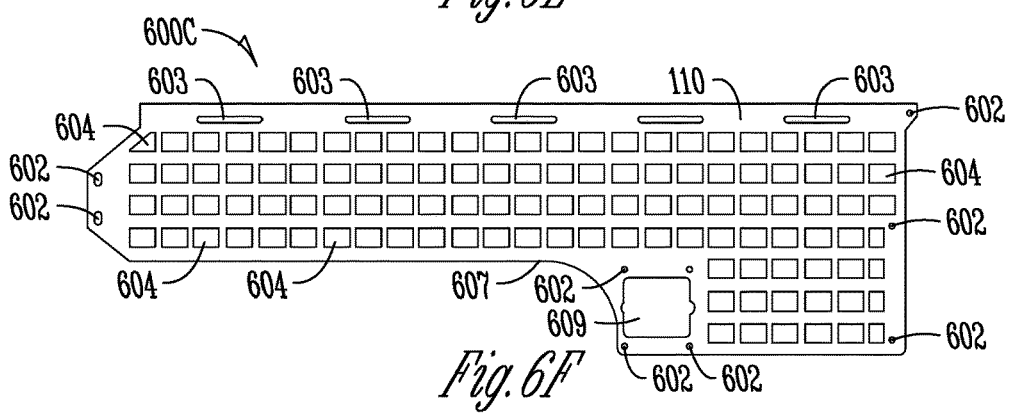
Figure 6G:
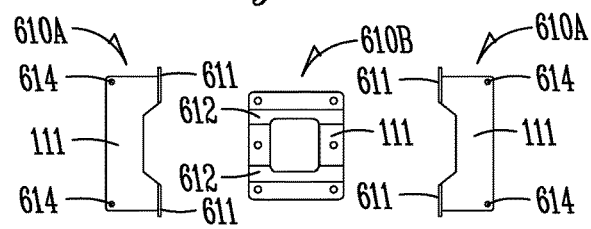
Figure 6G:
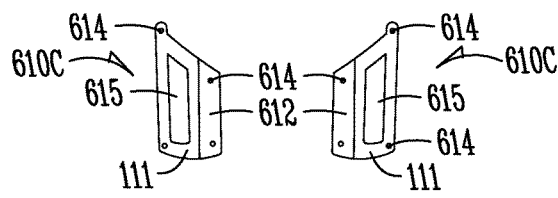

FIG. 6G, in particular, shows front bracket(s) 610A, middle bracket(s) 610B, rear bracket(s) 610C, bracket flange(s) 611, protruding surface(s) 612 separating and/or otherwise extending a main body portion of the bracket 111 from the bracket flange 611, bracket hole(s) 614, through which bolts and screws can be inserted, and bracket cutouts 615.

Regarding a method of installation for the panels 600A, 600B, 600C of this particular embodiment, exemplary and enumerated installation instructions follow:

1. begin by unscrewing and removing all factory removable tie-down hooks using a T40 Torx driver, then set these aside, as they will be re-used (most Ford Ranger beds come equipped with four tiedowns in total);
2. the rear brackets 610C install behind the rear tie-downs (closest to the tailgate 103), then place the rear bracket 610C in between the bed 102 and the rear tie-down, then fasten in place re-using factory hardware (if the Ford Ranger does not have a tie-down in this location, fasten the rear bracket 610C using M8 Bolts and note the rear brackets 610C can have different orientations depending on whether they attach to the driver-side or the passenger-side panels 600B, 600C);
3. install the middle brackets 610B and the front brackets 610A in the same manner, either installing them behind factory tie-downs or fastening using the M8 bolts, leave the front bracket 610A slightly loose, as the brackets 610A, 610B, 610C may need to be adjusted later on;
4. loosely assemble a jam nut onto each of the rubber feet, then screw the feet into the nutserts located on the bottom flange of the front panel 600A;
5. fasten all three panels 600A, 600B, 600C to the corresponding brackets 610A, 610B, 610C using M6 bolts and a T30 Torx driver;
6. the front part of each side panel 600B, 600C is fastened to the bed 102 in the same manner as the brackets 610A, 610B, 610C, either behind an existing tie-down, or using the M8 bolts;
7. adjust the rubber feet on the front panel 600A down until they are snug against the floor of the bed 102, then secure the rubber feet in place by tightening the jam nuts against the nutserts using a 10 mm wrench;
8. for additional stiffness, locate the blank hole located towards to top rear corner of each side panel 600B, 600C (this hole should line up with a hole in the bed 102), insert the provided rubber well nut into this hole, place the aluminum spacer between the well nut and the side panel 600B, 600C, insert the 2⅜" long bolt through the side panel 600B, 600C and spacer, thread the bolt into the well nut, tighten the bolt using a 3/16" hex key until the well nut is snug in the hole; and
9. once all the panels 600A, 600B, 600C are installed in the vehicle, ensure all fasteners are tightened until snug, but do not overtighten.

FIGS. 7A-7I show modular, lightweight load-carrying panels that include a holes 702 in a main body portion of the panel 110, elongated slots 703 in a main body portion of the panel 110, a PALS grid 704, and driver-side and passenger-side edge cutouts 706 on the front panel 700A. This embodiment is unique in that it employs a duality of panels 700B, 700C on the passenger-side (front and rear passenger-side panels, respectively) and another, mirrored, opposing duality of panels 700D, 700E on the driver-side (front and rear driver-side panels, respectively). In such an embodiment, the bottom edge of the driver-side panels 700D, 700E and passenger-side panels 700B, 700C comprise a splined edge 607 that tracks the wheel well 109A of a Ford Super Duty. The panels 700B-E also include substantially rectangular shaped cutouts 709 (with rounded corners) internally located within the main body portion of the panels 700B, 700C, 700D, 700E. The front panel 700A is shown as symmetrical about the line of symmetry 708.

Figure 7A:
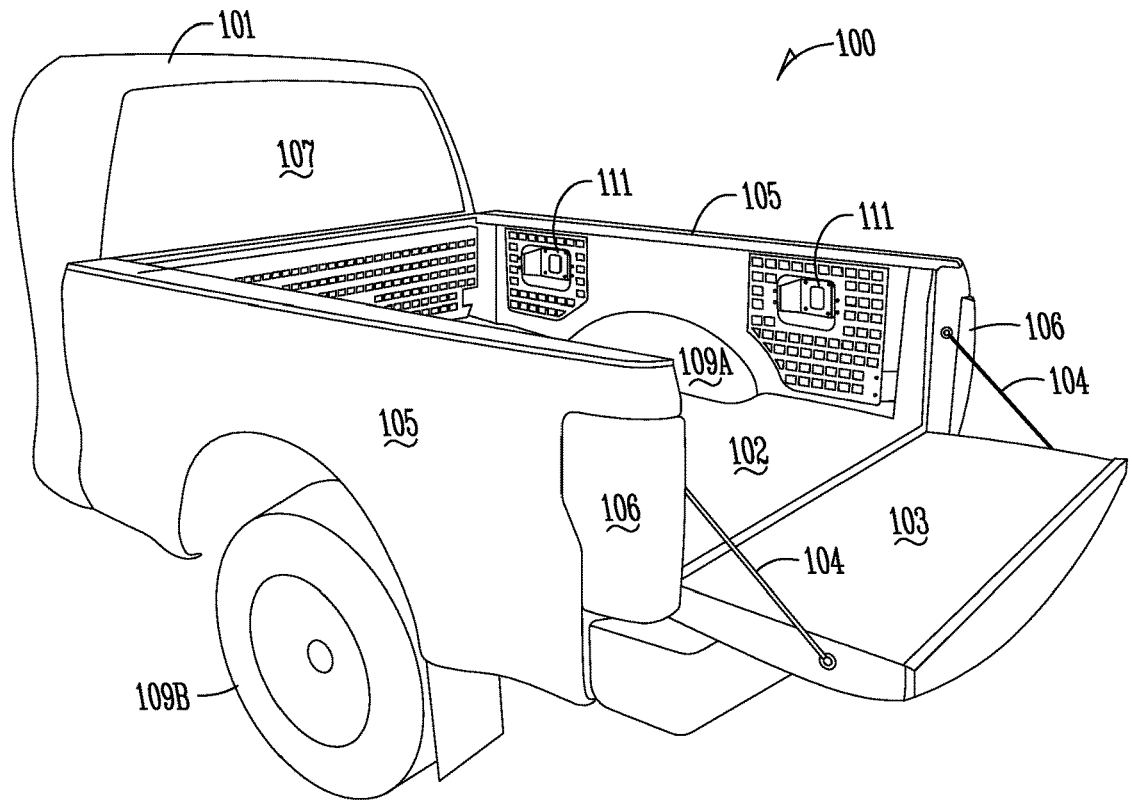
FIGS. 7A-7I exemplify one potential embodiment of the modular, lightweight load-carrying panel system, said embodiment being specifically designed for a Ford Super Duty. More particularly.
Figure 7B:
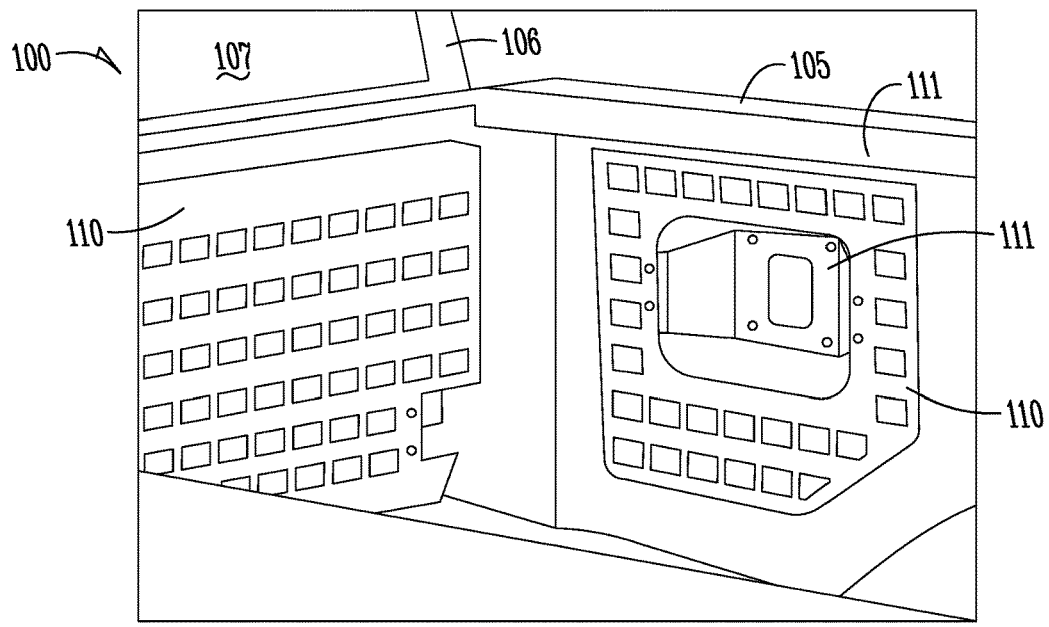
Figure 7C:
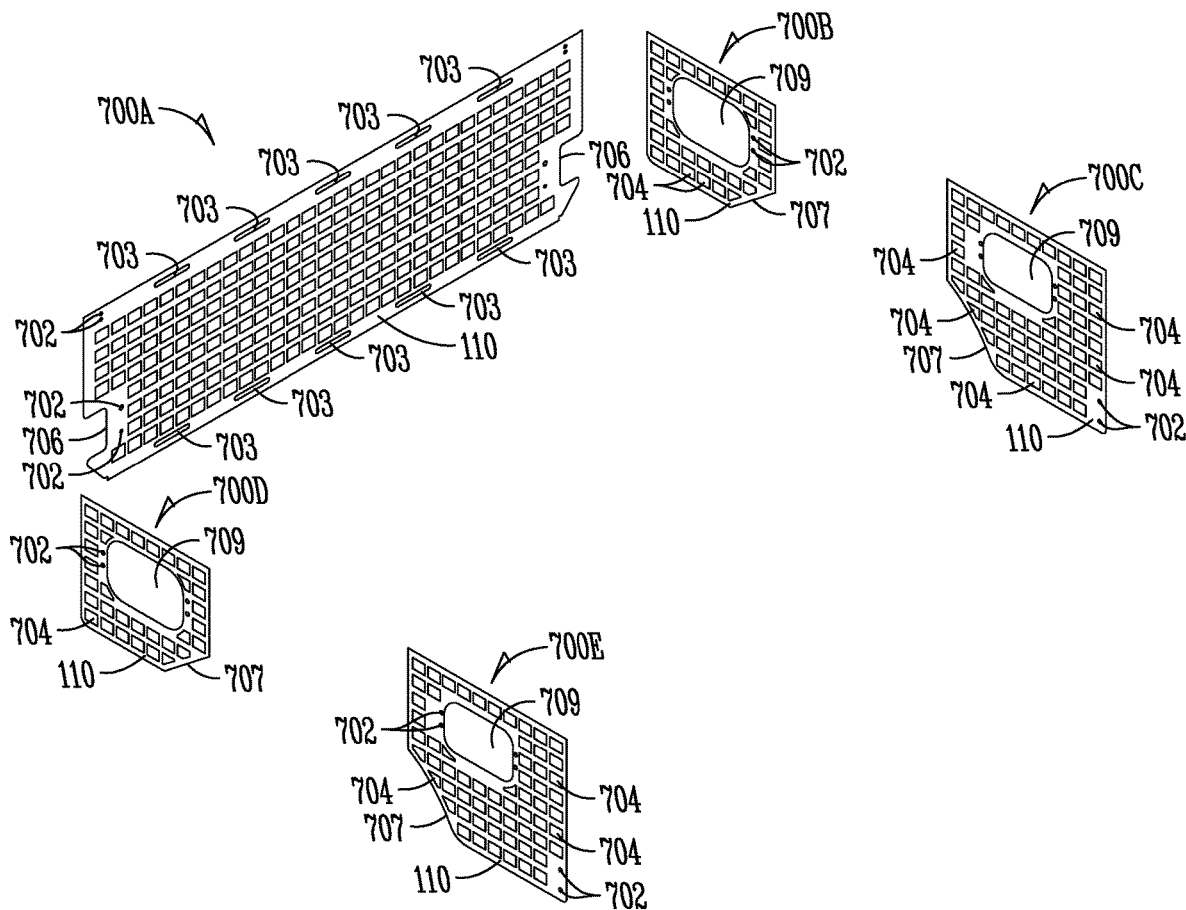
Figure 7D:
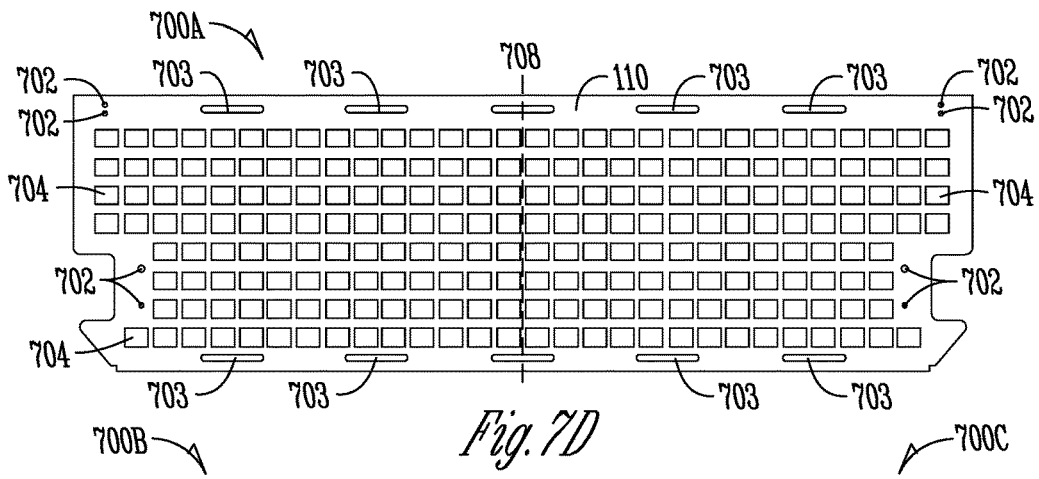
Figure 7E:
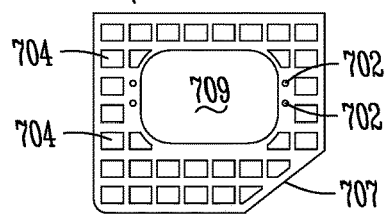
Figure 7F:
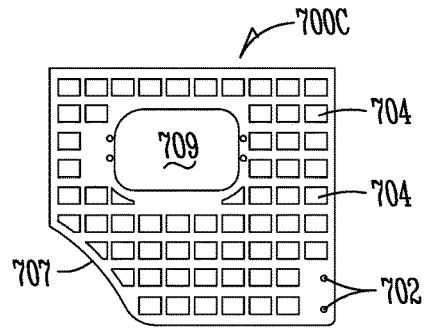
Figure 7G:
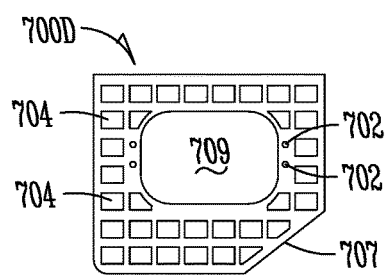
Figure 7H:
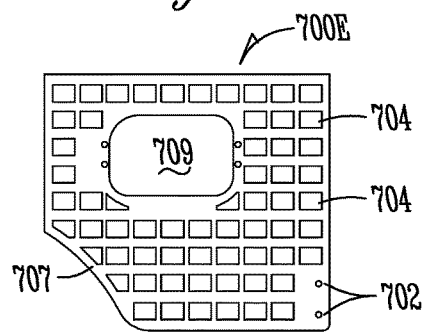
Figure 7I:
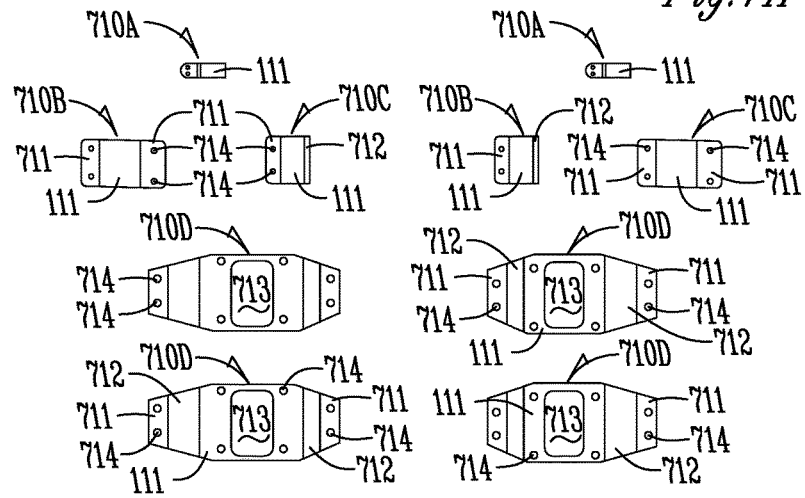

FIG. 7I, in particular, shows front upper bracket(s) 710A, rear bracket(s) 710B, front lower bracket(s) 710C, side bracket(s) 710D, bracket flange(s) 711, protruding surface(s) 712 separating and/or otherwise extending a main body portion of the bracket 111 from the bracket flange 711, bracket cutout(s) 713, and bracket hole(s) 614, through which bolts and screws can be inserted.

Regarding a method of installation for the panels 700A, 700B, 700C of this particular embodiment, exemplary and enumerated installation instructions follow:

1. unscrew and remove the four tie-down plates using a T30 Torx driver, place the side mounting brackets 710D behind the tie down plates, then fasten to the bed re-using factory hardware (note: for the 6.5 ft Super Duty the front side bracket can be larger than the one for the rear);
2. unscrew and remove the two rear tie-down hooks using a T30 Torx driver and place the rear brackets 710B behind the rear tie-down hooks, then fasten to the bed re-using factory hardware;
3. unscrew and remove the two front tie-down hooks using a T30 Torx driver and place the front lower brackets 710C behind the front tie-down hooks, then fasten to the bed re-using factory hardware;
4. loosely assemble one 5/16 bolt and one well nut to each of the two front upper brackets 710A, then insert the well nuts into the front slots located toward the top of each bed side, tighten the bolt using a 3/16 hex key until the well nut is snug in the slot (the upper side brackets 710A can be slightly adjusted forward and back within the slot 703 to get the desired rack position;
5. loosely assemble a jam nut onto each of the rubber feet, then screw the feet into the nutserts located on the bottom flange of the front panel 700A;
6. fasten the panels 700A, 700B, 700C to the corresponding brackets 710A, 710B, 710C, 710D using M6 bolts and a T30 Torx driver;
7. adjust the rubber feet on the front panel 700A down until they are snug against the floor of the bed 102, secure the rubber feet in place by tightening the jam nuts against the nutserts using a 10 mm wrench; and
8. once all the panels 700A, 700B, 700C are installed in the vehicle, ensure all fasteners are tightened until snug, but do not overtighten.

FIGS. 8A-8G show modular, lightweight load-carrying panels that include a panel flange 801, holes 5802 in the panel flange 801, elongated slots 803 in a main body portion of the panel 110, a PALS grid 804, and holes 806 in the main body portion of the panel 110, through which bolts and screws can be inserted. In such an embodiment, the bottom edge of the driver-side panel 800C and passenger-side panel 800B comprises a splined edge 807 that tracks the wheel well 109A of a Nissan Frontier. The panels 800A, 800B, and 800C includes a set (2, 3, 3, respectively) of trapezoidal shaped panel cutouts 809 that appear as notches along a top edge of the front panel 800A, driver-side panel 800C, and passenger-side panel 800B. The front panel 800A is shown as symmetrical about the line of symmetry 808.

Figure 8A:
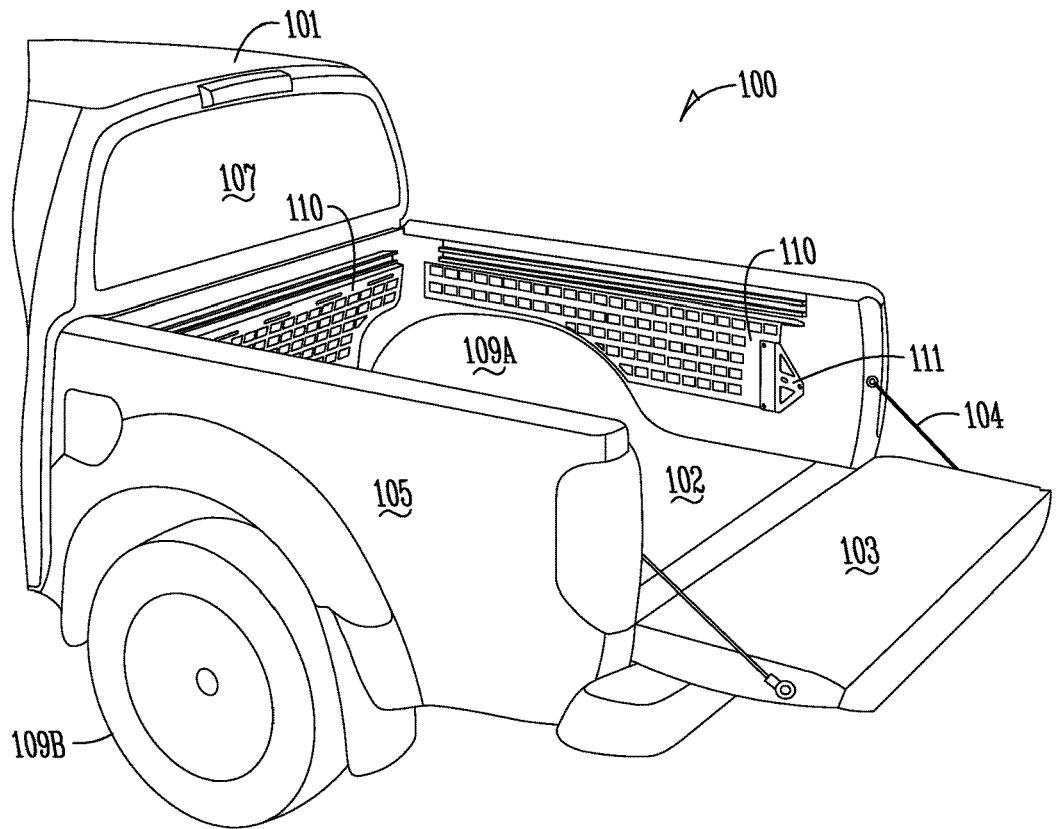
FIGS. 8A-8G exemplify one potential embodiment of the modular, lightweight load-carrying panel system, said embodiment being specifically designed for a Nissan Frontier. More particularly.
Figure 8B:
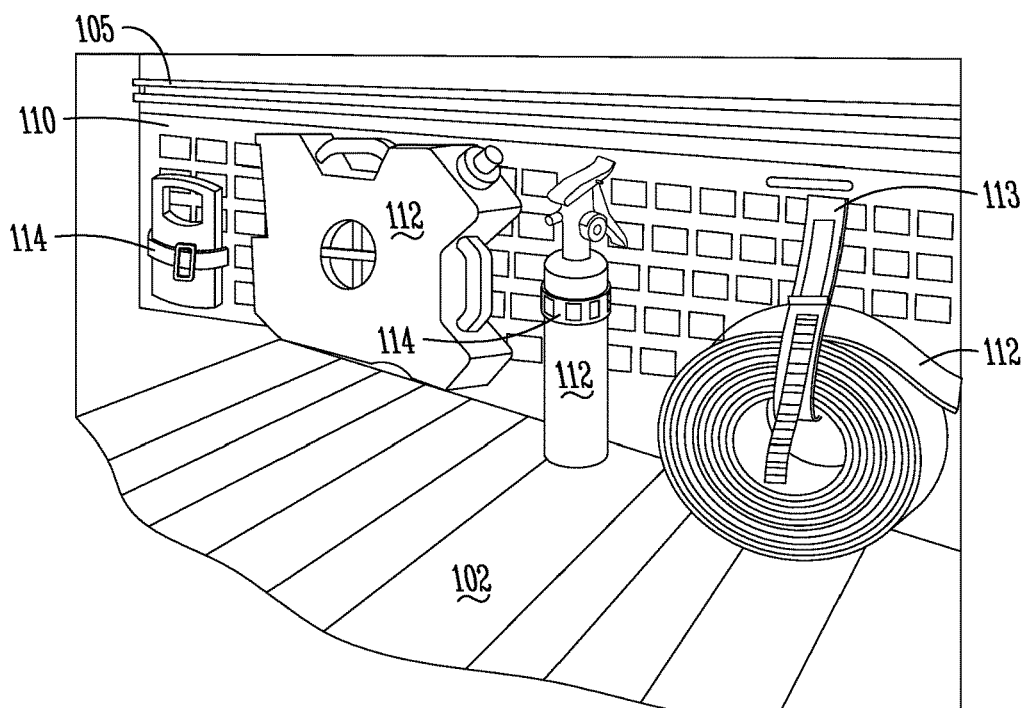
Figure 8C:
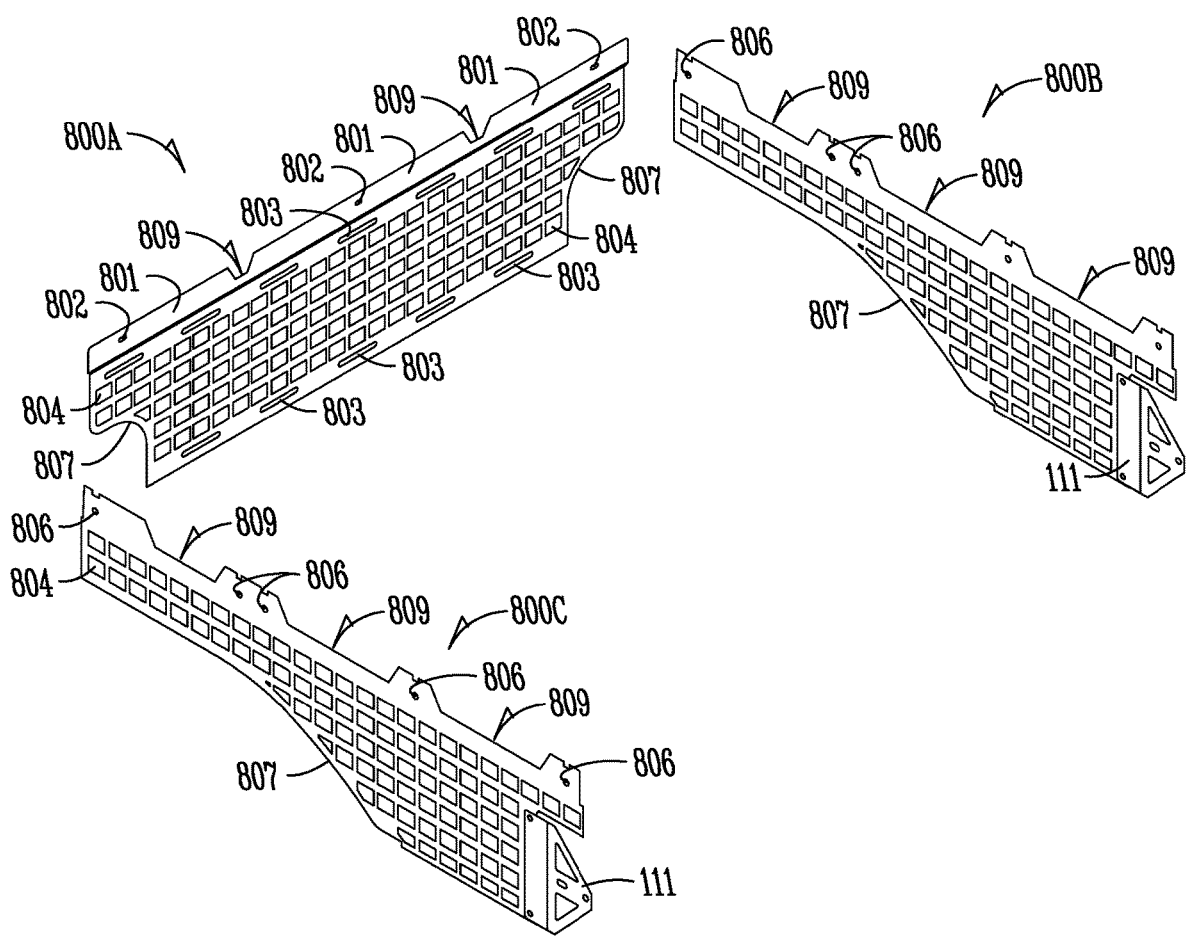
Figure 8D:
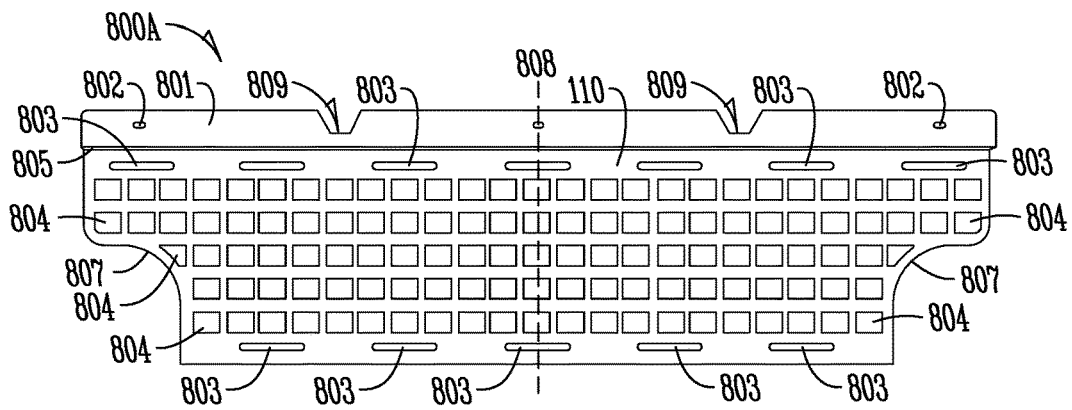
Figure 8E:
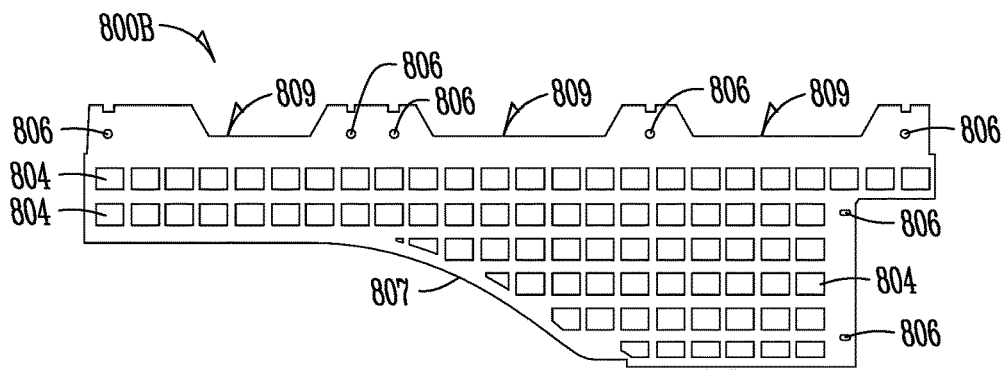
Figure 8F:
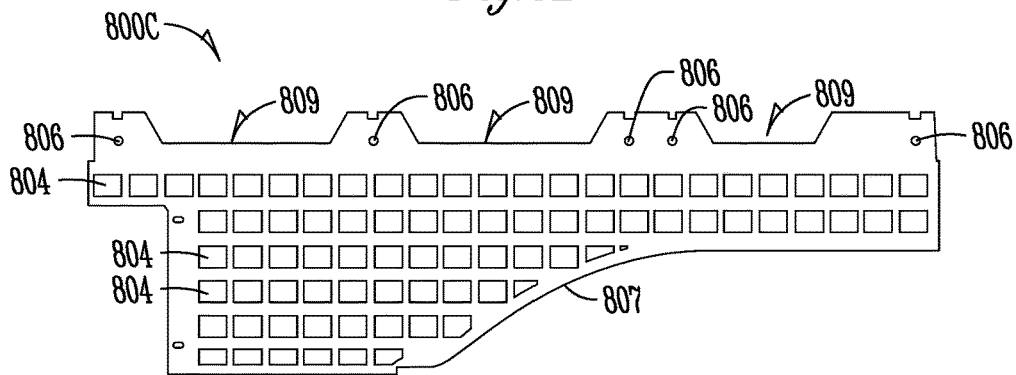
Figure 8G:
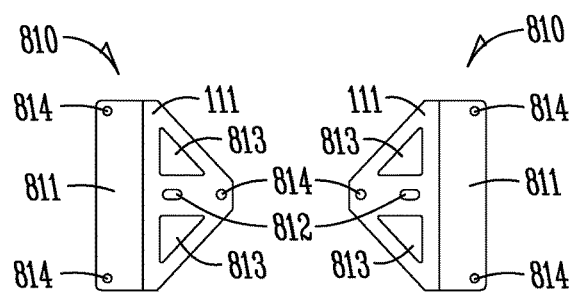
Figure 9A:
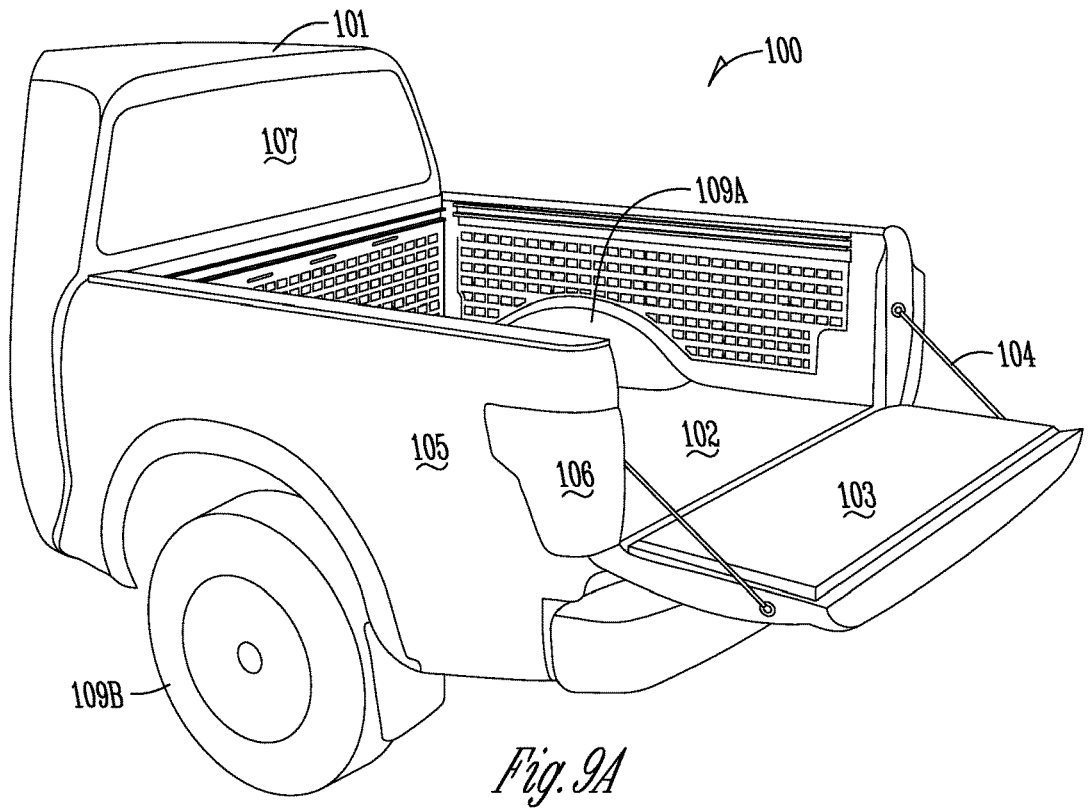
FIGS. 9A-9F exemplify one potential embodiment of the modular, lightweight load-carrying panel system, said embodiment being specifically designed for a Nissan Titan. More particularly.
Figure 9B:
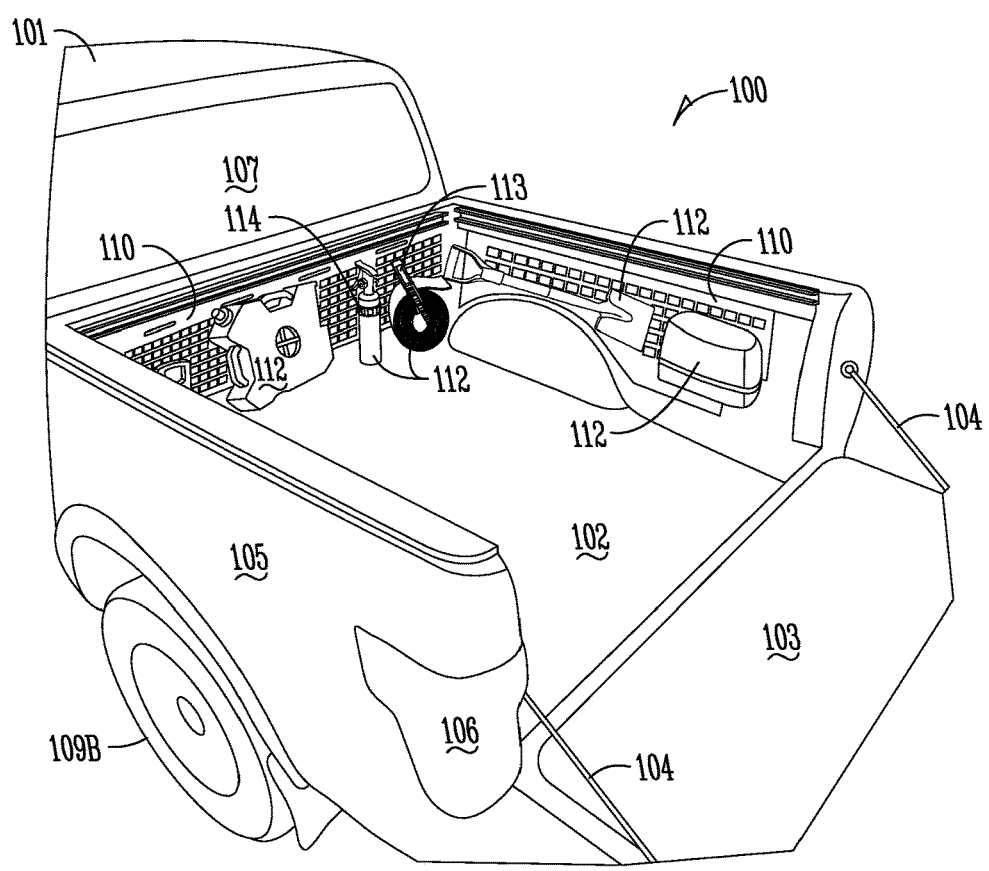
Figure 9C:
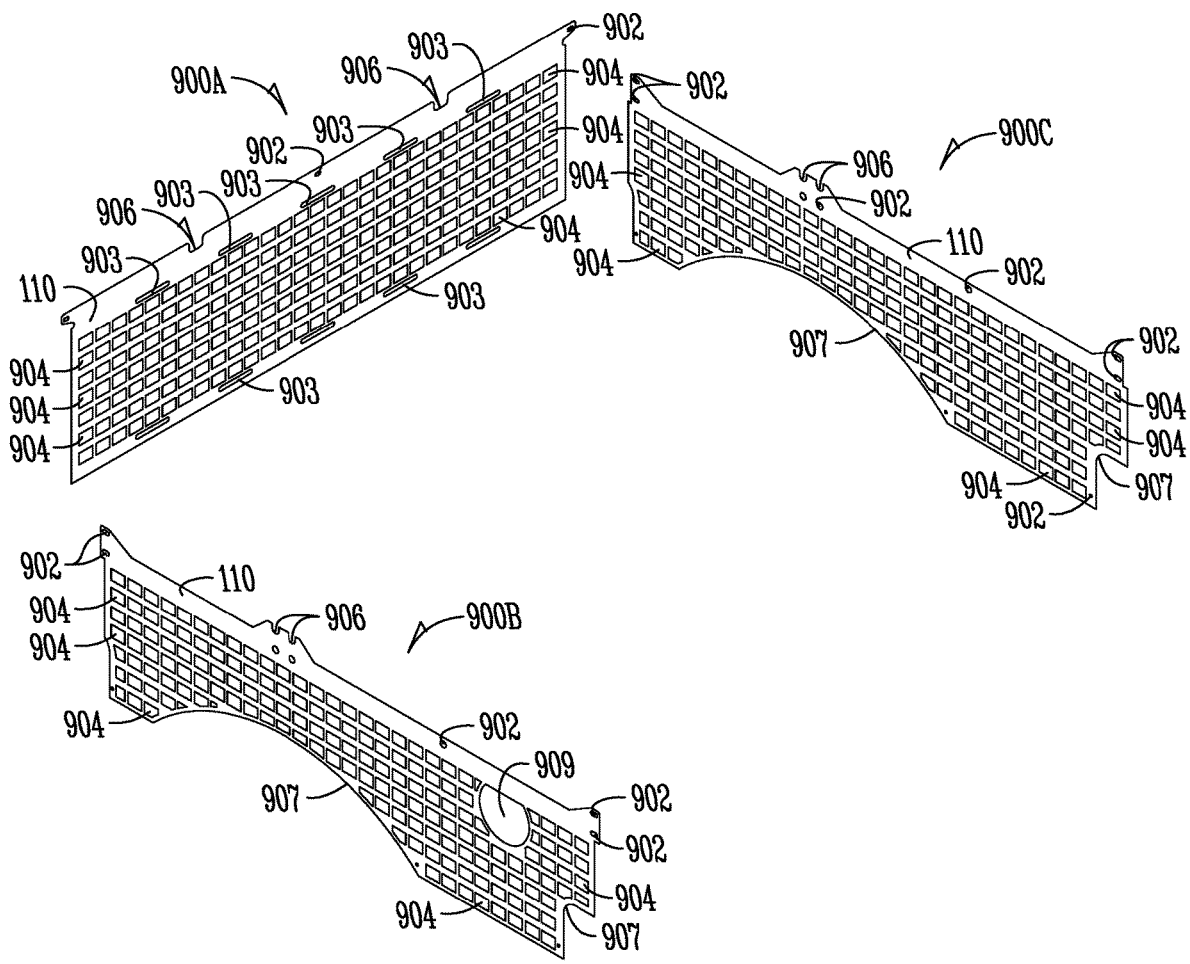
Figure 9D:
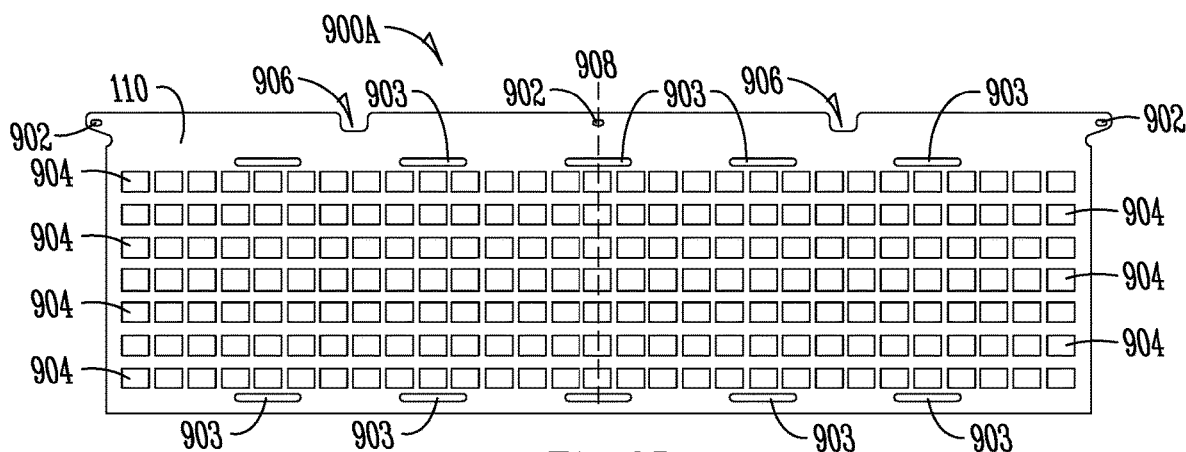
Figure 9E:
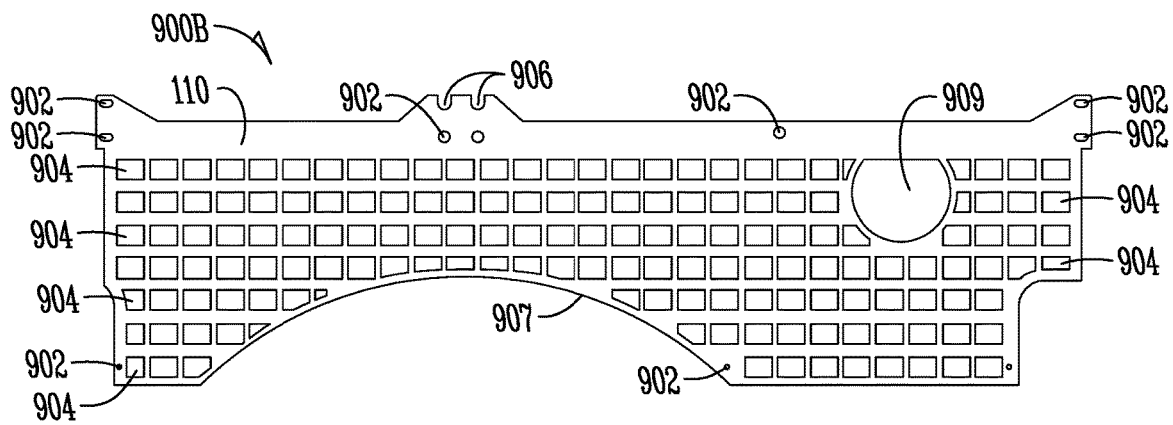
Figure 9F:
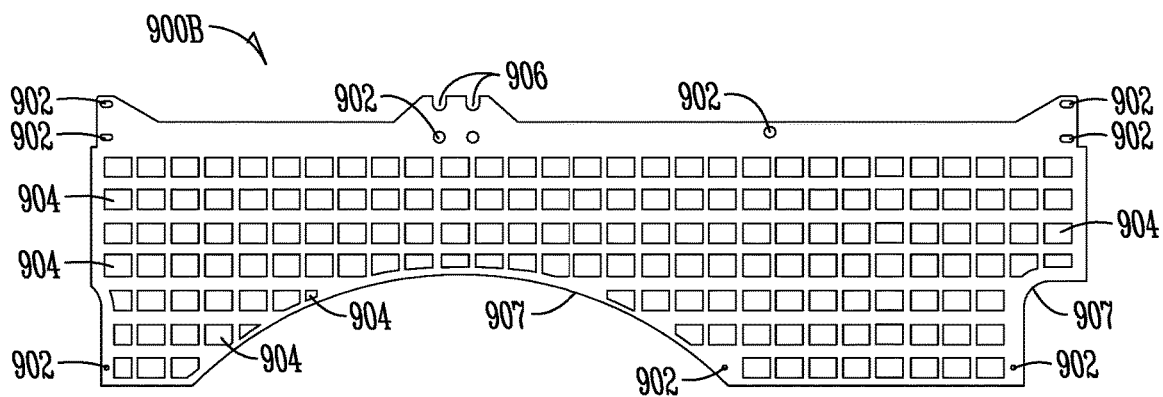

FIG. 8G, in particular, shows bracket(s) 810, a bracket flange 811, bracket cutout(s) 813, and bracket hole(s) 814, through which bolts and screws can be inserted.

Regarding a method of installation for the panels 800A, 800B, 800C of this particular embodiment, exemplary and enumerated installation instructions follow:
1. unscrew and remove all in-bed rails (Nissan rails are attached with T40 Torx-head bolts);
2. unscrew and remove all tie-down hooks using a T40 Torx driver, place the side brackets 810 behind the tie-down hooks, then fasten to the bed re-using factory hardware (note: some Nissan Frontiers do not include tie-down hooks, leaving the mounting holes blank. In this case, use of pliers or a trim-removal tool to pull out the plastic plugs where the tie-down hooks would be, then attach the side brackets using the supplied M8 bolts and a T40 Torx driver);
3. loosely assemble a jam nut onto each of the rubber feet, then screw the feet into the nutserts located on the bottom flange of the panels 800A, 800B, 800C (not all panels require rubber feet);
4. place the panels 800A, 800B, 800C on the backside of the in-bed rails, then fasten to the bed re-using the factory hardware;
5. fasten the panels 800A, 800B, 800C to the brackets 810 using M6 bolts and a T30 Torx driver;
6. adjust the rubber feet on the panels 800A, 800B, 800C down until they are snug against the floor of the bed, then secure the rubber feet in place by tightening the jam nuts against the nutserts using a 10 mm wrench; and
7. once all the panels 800A, 800B, 800C are installed in the vehicle, ensure all fasteners are tightened until snug, but do not overtighten.

FIGS. 9A-9G show modular, lightweight load-carrying panels that include a holes 902 in a main body portion of the panel 110, elongated slots 903 in a main body portion of the panel 110, a PALS grid 904, and small notches 906 on the upper edge of the driver-side panel 900B and passenger-side panel 900C. In such an embodiment, the bottom edge of the driver-side panel 900B and passenger-side panel 900C comprise a splined edge 907 that tracks the wheel well 109A of a Nissan Titan and a partially circularly shaped cutout 909 (with slight bulges appearing on the left-hand and right-hand sides of said substantially rectangular cutouts) internally located within the main body portion of the driver-side panel 900B. The front panel 900A is symmetrical about the line of symmetry 908. This embodiment is further unique in that no mounting brackets 111 are required for installation.

Regarding a method of installation for the panels 900A, 900B, 900C of this particular embodiment, exemplary and enumerated installation instructions follow:
1. unscrew and remove all in-bed rails (Nissan rails are attached with T40 Torx-head bolts);
2. loosely assemble a jam nut onto each of the rubber feet, then screw the feet into the nutserts located on the bottom flange of the panels 900A, 900B, 900C (not all panels will require rubber feet);
3. place the panels 900A, 900B, 900C on the backside of the in-bed rails, then fasten to the bed re-using the factory hardware;
4. adjust the rubber feet on the panels 900A, 900B, 900C down until they are snug against the floor of the bed 102, then secure the rubber feet in place by tightening the jam nuts against the nutserts using a 10 mm wrench; and
5. once all the panels 900A, 900B, 900C are installed in the vehicle, ensure all fasteners are tightened until snug, but do not overtighten.

In greater particularity, FIGS. 10A-10G show modular, lightweight load-carrying panels that include holes 1002 in the panel flange 1001, through which bolts and screws can be inserted, elongated slots 1003 in a main body portion of the panel 110, a PALS grid 1004, and substantially rectangular cutouts 1006 (uniquely present in all panels 1000A, 1000B, 100C of this embodiment, said rectangular cutouts 1006 having rounded corners) in the main body portion of the panel 110. In such an embodiment, the bottom edge of the driver-side panel 1000C and passenger-side panel 1000B comprises a splined edge 1007 that tracks the wheel well 109A of a Chevy Colorado. At a rear end of the said panels 400B, 400C, a cutout with a substantially orthogonal angle 1009 exists to give some clearance for tow hooks toward the rear of the bed 102. This embodiment is further unique in that there is no axis of symmetry for front panel 1000A. Front panel 1000A includes a splined lower edge 1007 instead of only straight and/or orthogonally oriented lower edge(s).

Figure 10A:
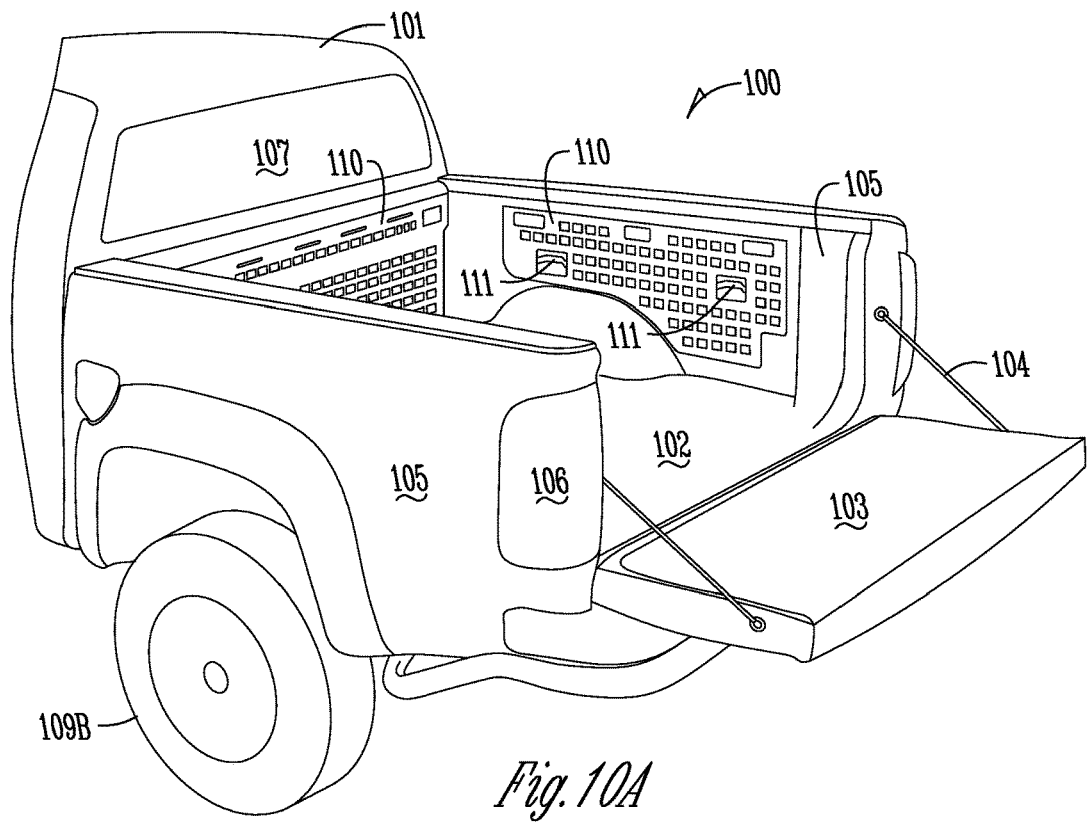
FIGS. 10A-10G exemplify one potential embodiment of the modular, lightweight load-carrying panel system, said embodiment being specifically designed for a Chevy Colorado. More particularly.
Figure 10B:
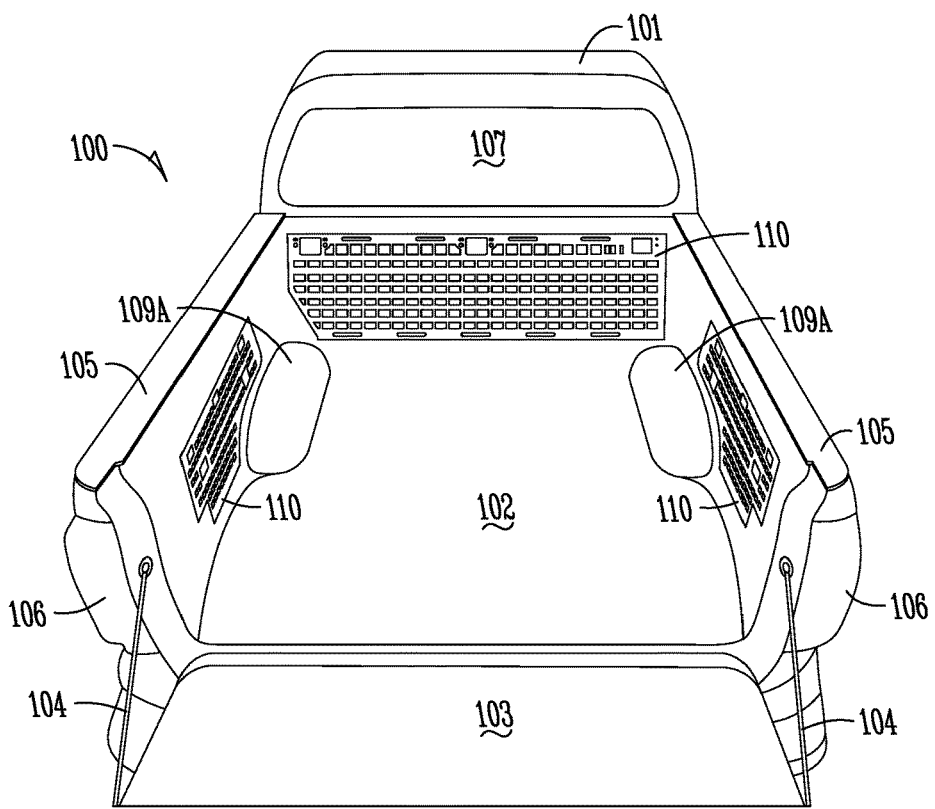
Figure 10C:
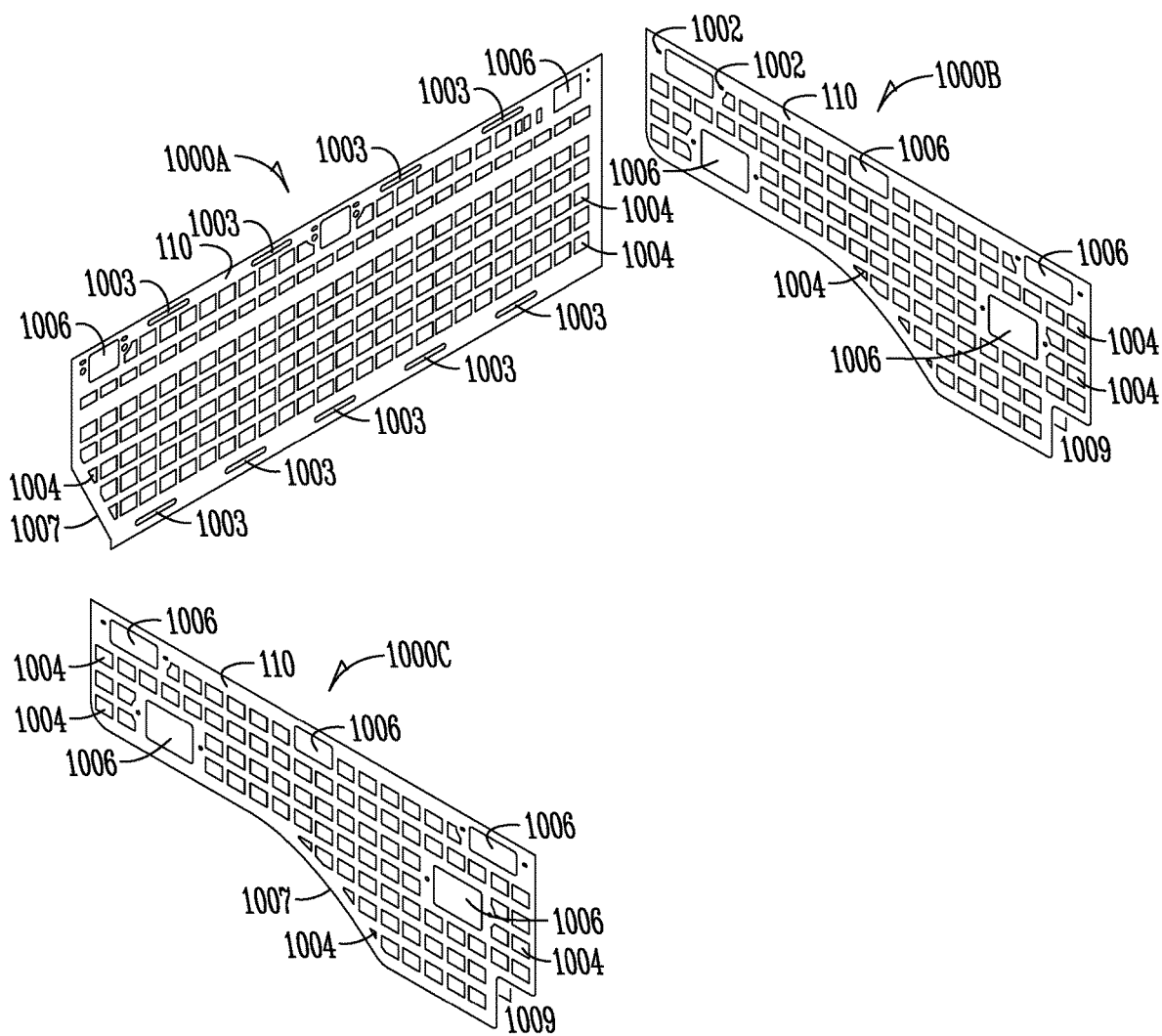
Figure 10D:
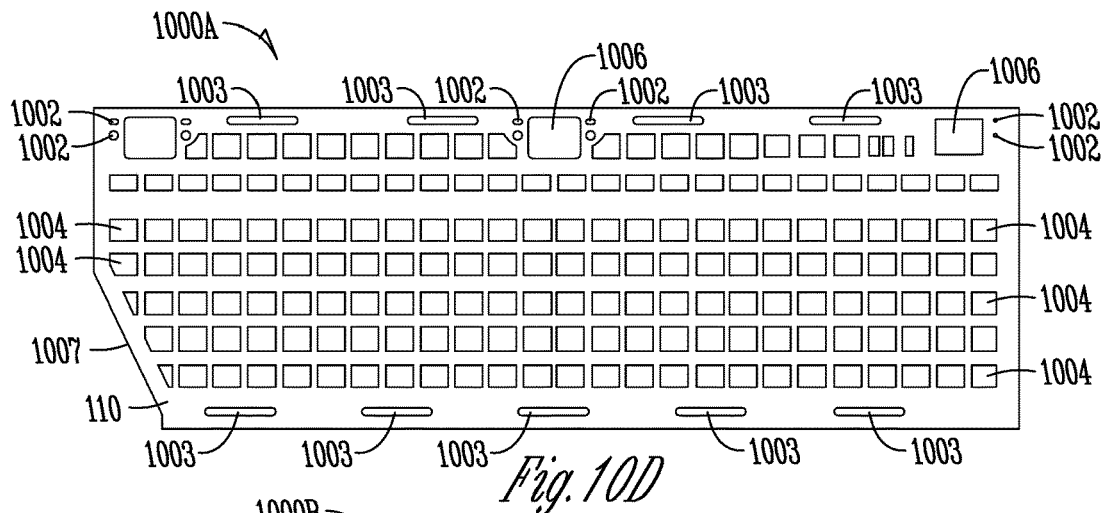
Figure 10E:
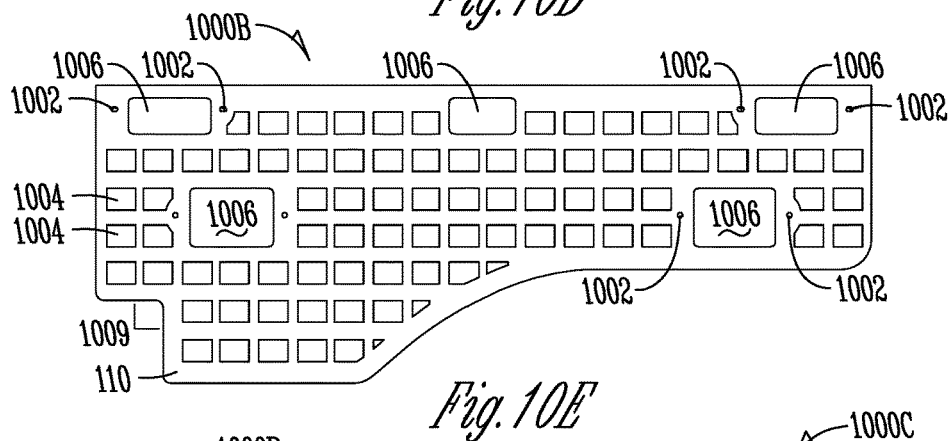
Figure 10F:
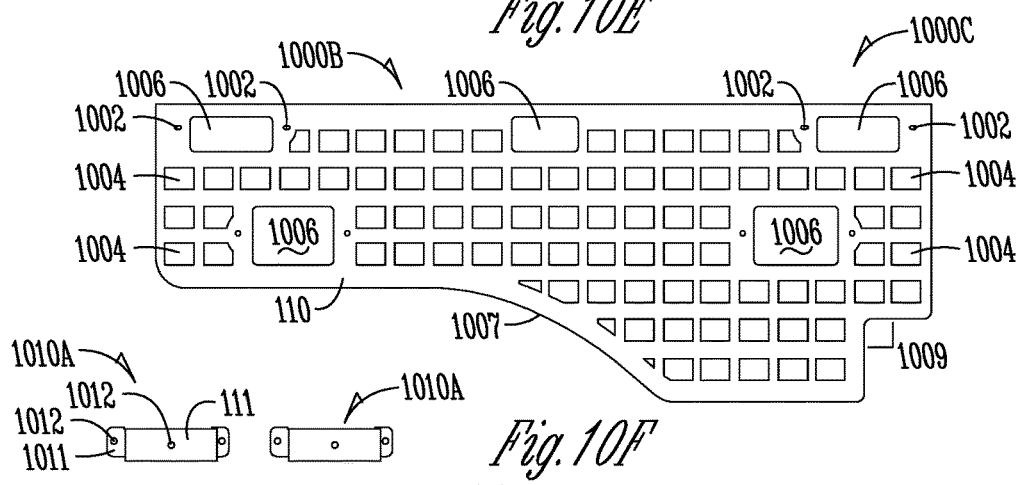
Figure 10G:
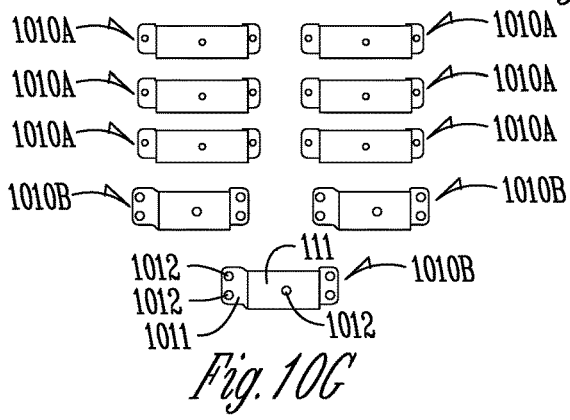

FIG. 10G, in particular, shows a side brackets 1010A, front bracket 1010B, bracket flange(s) 1011, and bracket hole(s) 1012, through which bolts and screws can be inserted.

Regarding a method of installation for the panels 1000A, 1000B, 1000C of this particular embodiment, exemplary and enumerated installation instructions follow:
1. begin by locating and removing the plastic oval covers from the bed using a small flat-head screwdriver;
2. loosely assemble a 5/16 bolt, tabbed washer, and nut plate to each bracket 1010A, 1010B;
3. grab one of the assembled brackets and insert the nut plate into one of the required bed slots (the nut plate will have to be inserted at an angle in order to fit), then orient the nut plate so that it is perpendicular and centered behind the slot, then push the tabbed washer against the bed side so that the tabs fit into the slot (if aligned correctly, the tabs should prevent the nut plate from spinning), then while keeping the tabbed washer in the slot pull back on the bolt and begin to tighten, finally, repeat this process for the rest of the required slots in the bed;
4. attach the side panels 1000B, 1000C to the side brackets 1010A using M6 bolts (the brackets 1010A may have to be adjusted to make get the holes to line up);
5. loosely assemble to front panel 1000A by loosely screwing a jam nut onto each of the rubber feet, then loosely screwing the rubber feet into the riv-nuts in the bottom bend of the front panel 1000A;
6. fasten the front panel 1000A onto the front brackets 1010B using M6 bolts;
7. once the front panel 1000A is secured to the front brackets 1010A, adjust the rubber feet so that they sit tight to the bed 102 of the truck (this helps prevent vibration while driving), and once the feet are in the correct position, tighten the jam nuts to secure them in place; and
8. once all the panels 1000A, 1000B, 1000C are installed in the vehicle, ensure all fasteners are tightened until snug, but do not overtighten.

FIGS. 11A-11G show modular, lightweight load-carrying panels that include a holes 1102 in a main body portion of the panel 110, elongated slots 1103 in a main body portion of the panel 110, a PALS grid 1104, and substantially rectangular cutouts 1106 (with rounded corners) on the driver-side and passenger-side panels 1100B, 1100C. In such an embodiment, the bottom edge of the driver-side panel 1100B and the passenger-side panel 1100C comprise a splined edge 1107 that tracks the wheel well 109A of a Dodge Ram LD. The front panel 1100A is shown as symmetrical about the line of symmetry 1108.

Figure 11A:
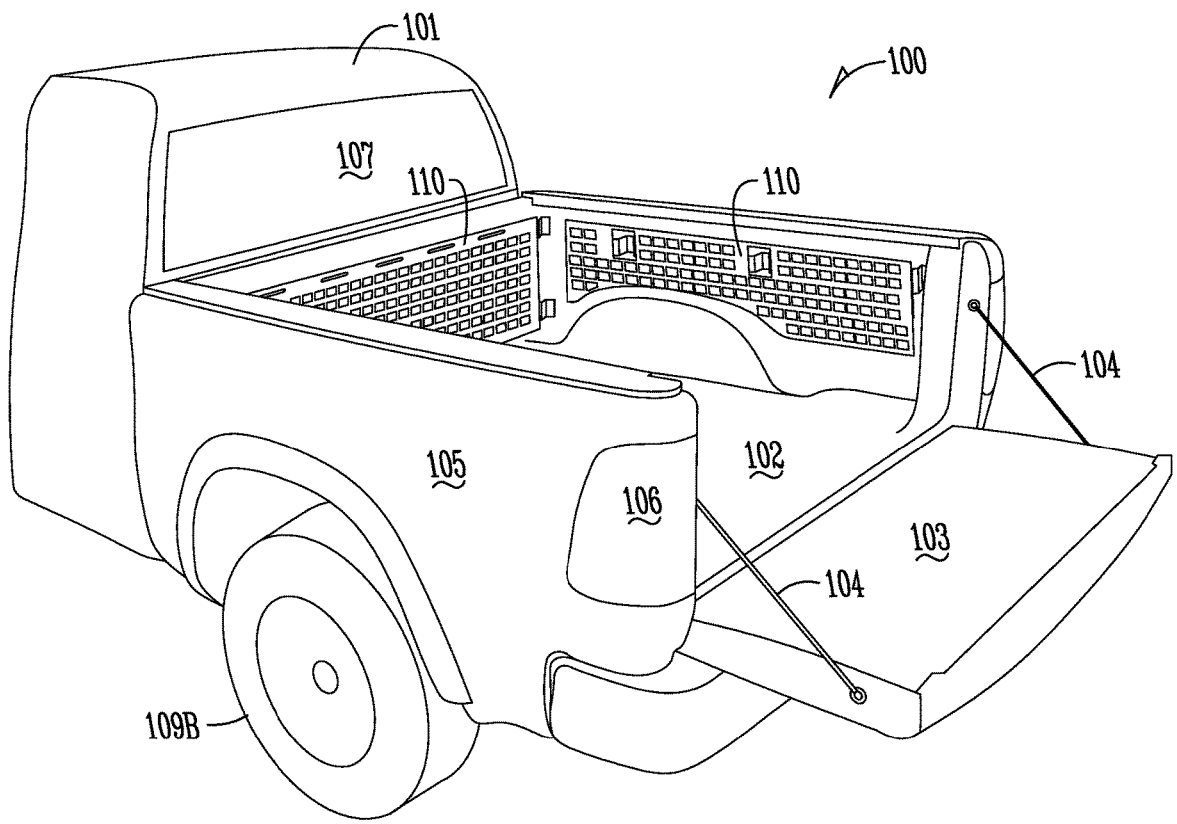
FIGS. 11A-11G exemplify one potential embodiment of the modular, lightweight load-carrying panel system, said embodiment being specifically designed for a Dodge Ram LD. More particularly.
Figure 11B:
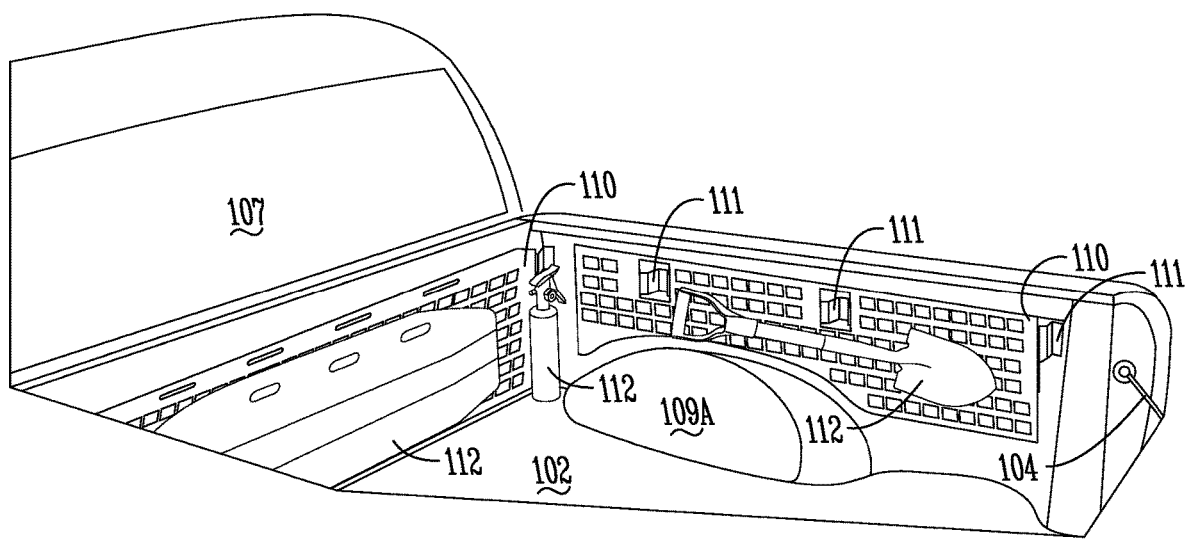
Figure 11C:
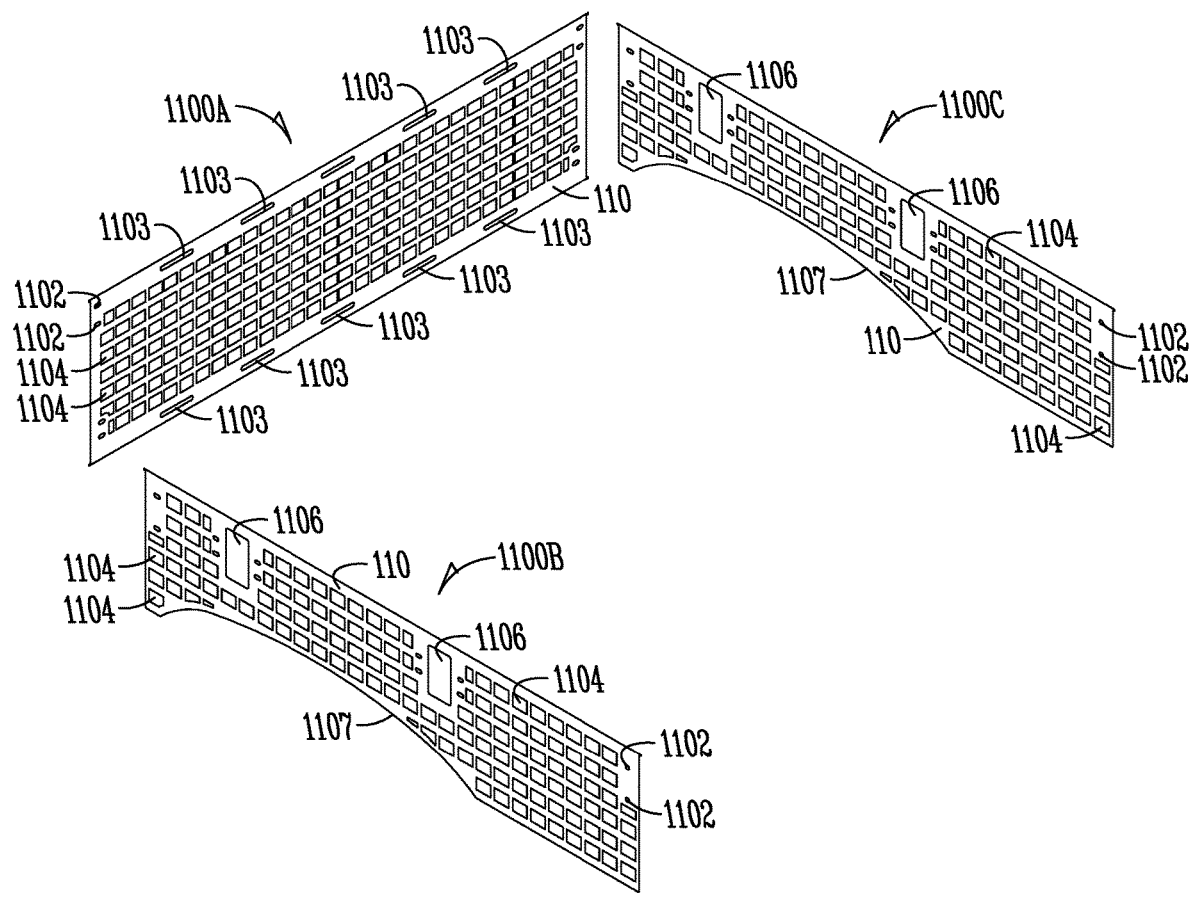
Figure 11D:
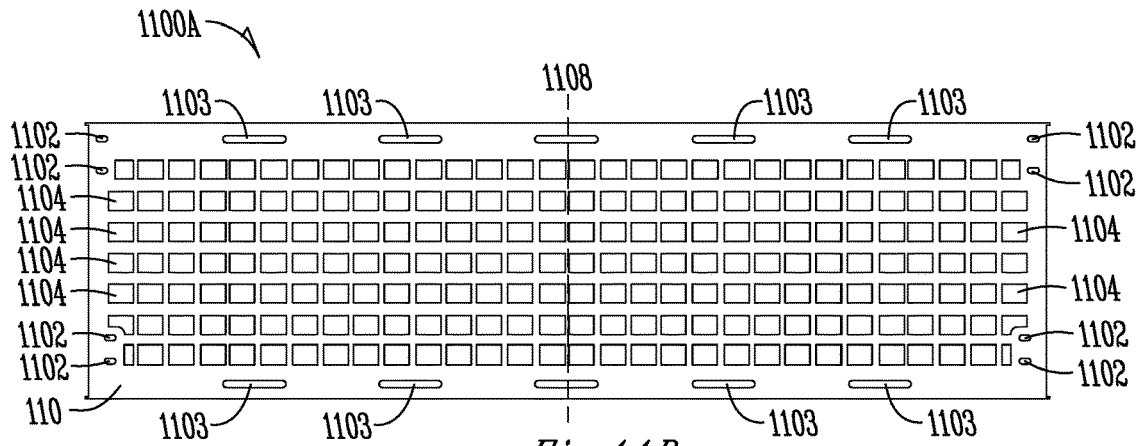
Figure 11E:
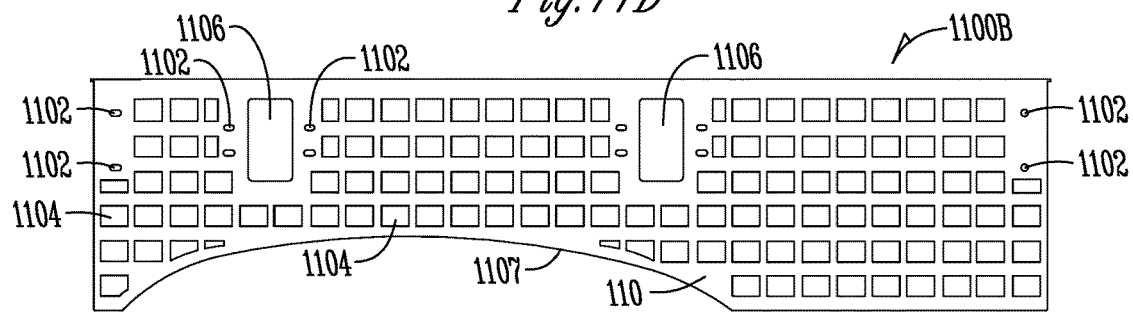
Figure 11F:
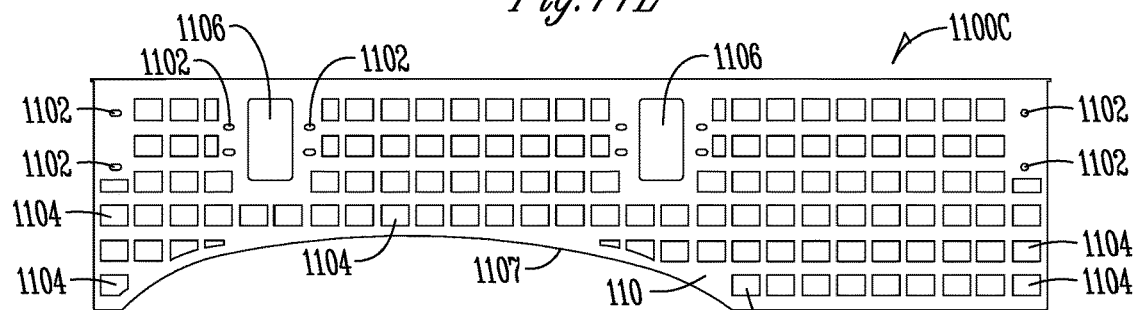
Figure 11G:
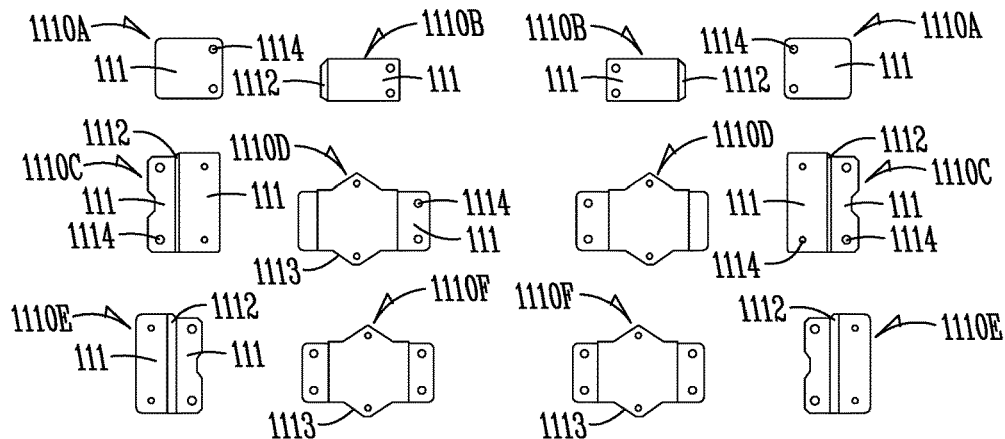

FIG. 11G, in particular, shows front upper bracket(s) 1110A, front lower mounting bracket(s) 1110B, side front mounting bracket(s) 1110C, first double flange side mounting bracket(s) 1110D, side rear mounting bracket(s) 1110E, second double flange side mounting bracket(s) 1110F, bracket flange(s) 1111, protruding surface(s) 1112 separating and/or otherwise extending a main body portion of the bracket 111 from the bracket flange 1111, edge protrusions 1113, and bracket hole(s) 1114, through which bolts and screws can be inserted. In at least some embodiments, the side front bracket(s) 1110C and side rear mounting bracket(s) 1110E are identical, as are the first double flange side mounting bracket(s) 1110D and the second double flange side mounting bracket(s) 1110F.

Regarding a method of installation for the panels 1100A, 1110B, 1110C of this particular embodiment, exemplary and enumerated installation instructions follow:

1. gather the single flange side mounting brackets 1110C, 1110E and the double flange side mounting brackets 1110D, 1110F and then loosely assemble two 5/16" well nuts and two Philip's head screws onto each of these brackets 1110C-F;
2. the LD Ram has hex-shaped holes in the bedsides that will be used to mount the side panels 1100B, 1100C, the double flange brackets 1110D, 1110F mount to the middle sets of holes, and the single flange brackets 1110C, 1110E mount to the outer sets of holes;
3. fasten the brackets to the bed by inserting the well nuts into the hex-shaped holes, then tighten the Philip's head screws until the well nuts are snug in the hex-shaped holes;
4. gather the two front upper brackets 1110A, loosely assemble one 2⅜" long Allen head bolt, in-bed washer, and nut plate onto each of these brackets 1110A;
5. install the front upper bracket 1110A assemblies by inserting the nut plate into the slot located towards the top of each bed side (the nut plate will have to be inserted at an angle in order to fit), then orient the nut plate so that it is perpendicular and centered behind the slot and push the tabbed washer against the bed side so that the tabs fit into the slot (if aligned correctly, the tabs should prevent the nut plate from spinning), and while keeping the tabbed washer in the slot, pull back on the bolt and begin to tighten until snug;
6. locate the two remaining front lower brackets 1110B and loosely assemble a 3/4-inch well nut and 1.5-inch long Allen head bolt onto each bracket 1110B, then install the lower bracket 1110B assemblies by inserting the well nut into the slot located just next to the forward tie-down hook before tightening the bolt using a 7/32 hex key until the well nut is snug in the slot;
7. prepare the front panel 1100A to be installed by threading a jam nut onto each of the rubber feet, then loosely screw the rubber feet into the riv-nuts located on the bottom flange of the front panel 1100A;
8. fasten all panels 1100A, 1100B, 1100C to the corresponding brackets 1110A-F using the provided Torx-head screws and a T30 Torx driver;
9. adjust the rubber feet on the front panel 1100A down until they are snug against the floor of the bed 102, then secure the rubber feet in place by tightening the jam nuts against the front plate 1100A using a 10 mm wrench; and
10. once all the panels 1100A, 1100B, 1100C are installed in the vehicle, ensure all fasteners are tightened until snug, but do not overtighten.

FIGS. 12A-12G show modular, lightweight load-carrying panels that include a holes 1202 in a main body portion of the panel 110, elongated slots 1203 in a main body portion of the panel 110, a PALS grid 1204, and a duality (front and rear) of substantially rectangular cutouts 1206 (with rounded corners) on the driver-side and passenger-side panels 1200B, 1200C. In such an embodiment, the bottom edge of the driver-side panel 1200B and the passenger-side panel 1200C comprise a splined edge 1207 that tracks the wheel well 109A of a Dodge Ram HD. The front panel 1200A is shown as symmetrical about the line of symmetry 1208.

Figure 12A:
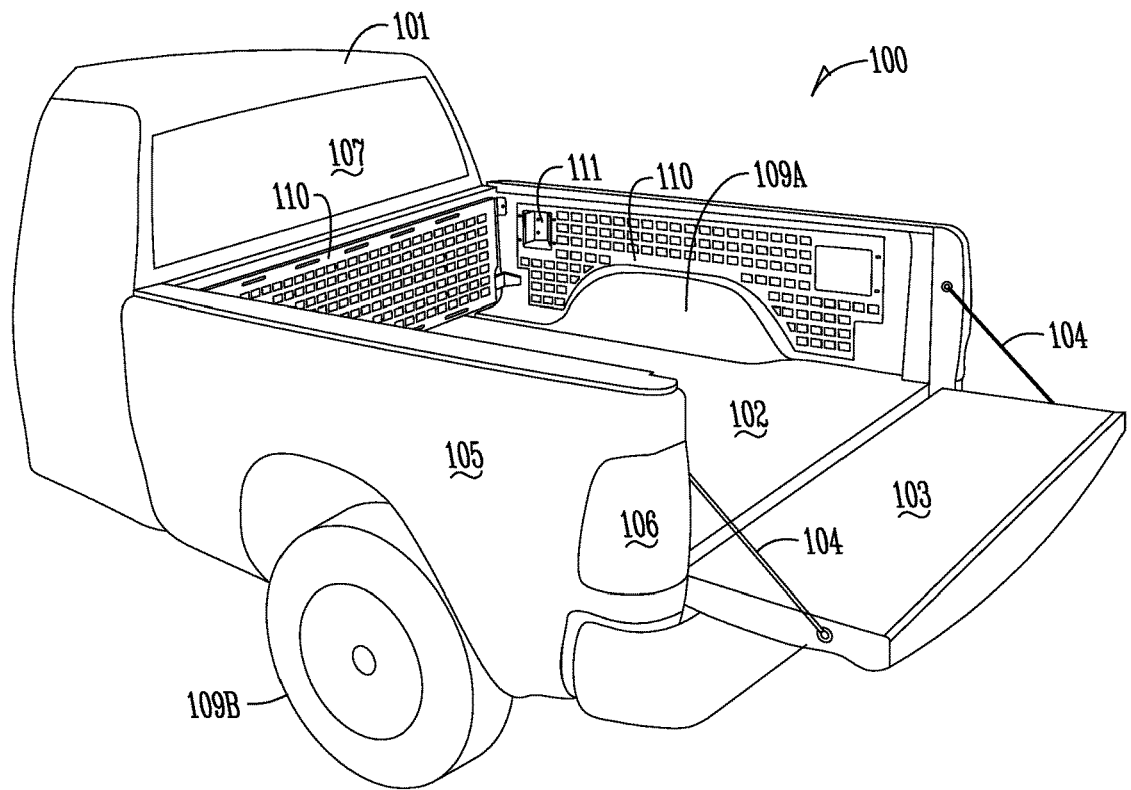
FIGS. 12A-12G exemplify one potential embodiment of the modular, lightweight load-carrying panel system, said embodiment being specifically designed for a Dodge Ram HD. More particularly.
Figure 12B:
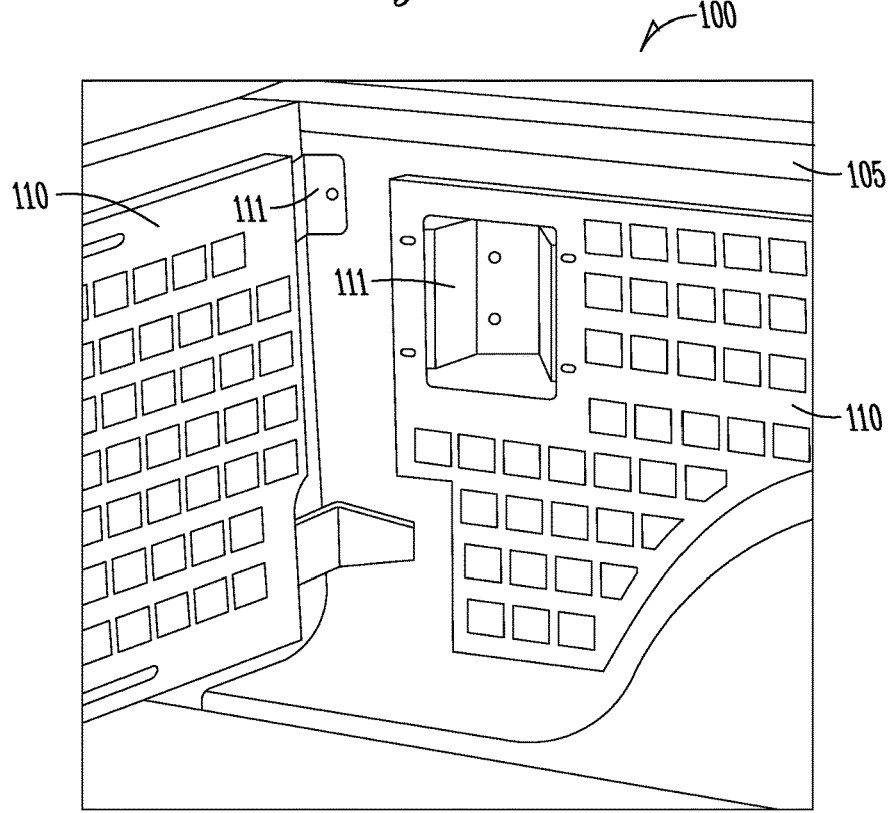
Figure 12C:
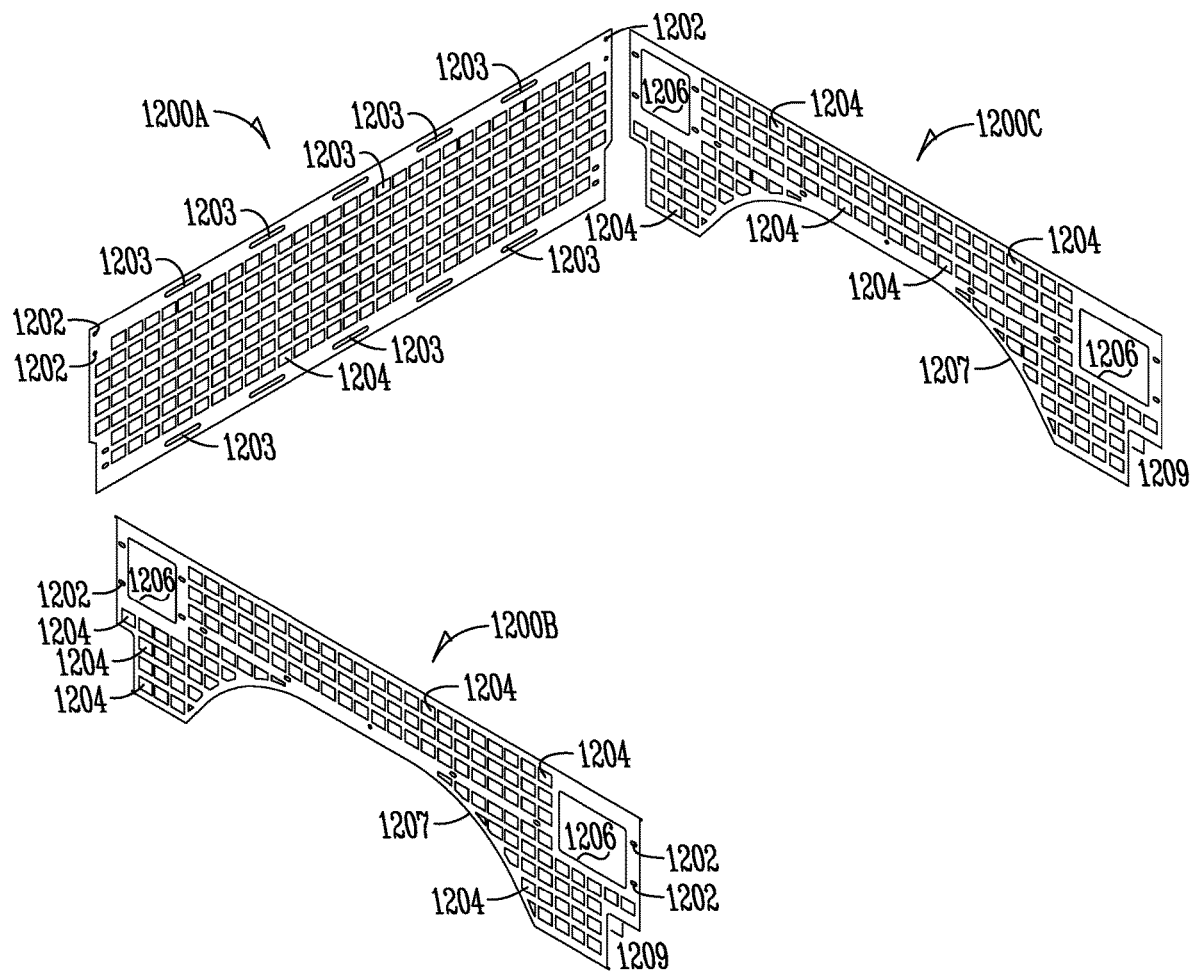
Figure 12D:
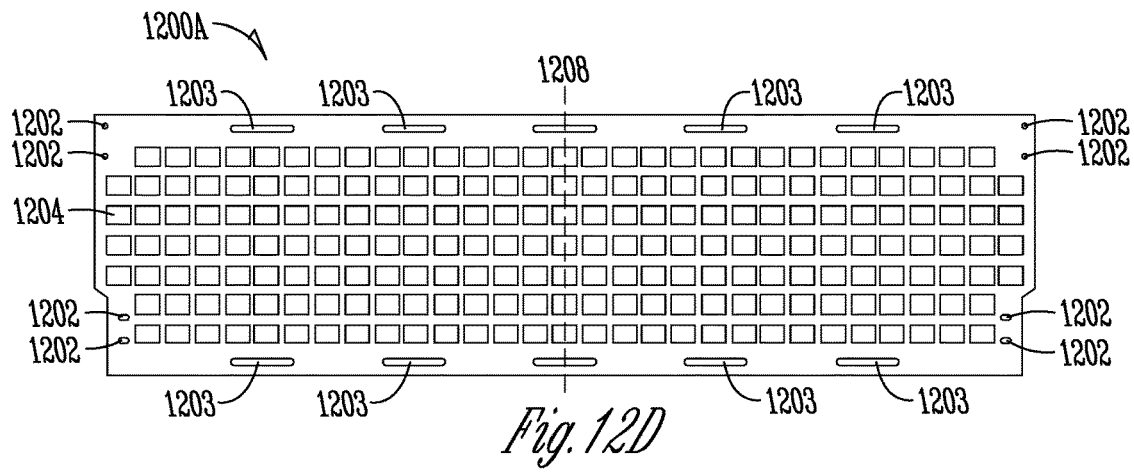
Figure 12E:
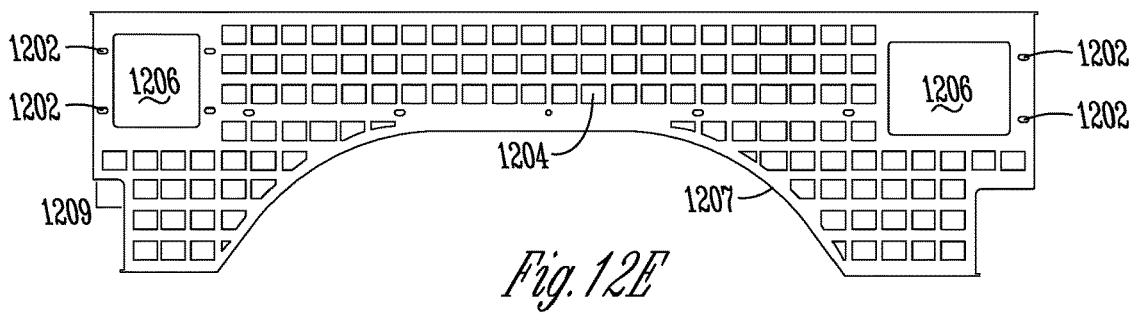
Figure 12F:
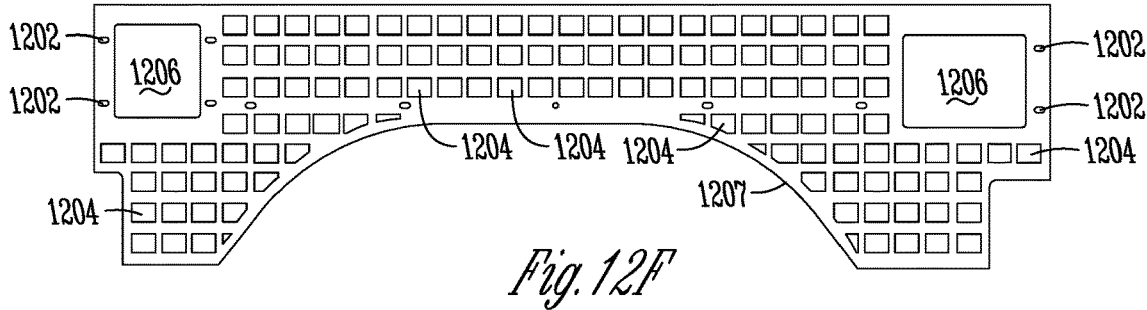
Figure 12G:
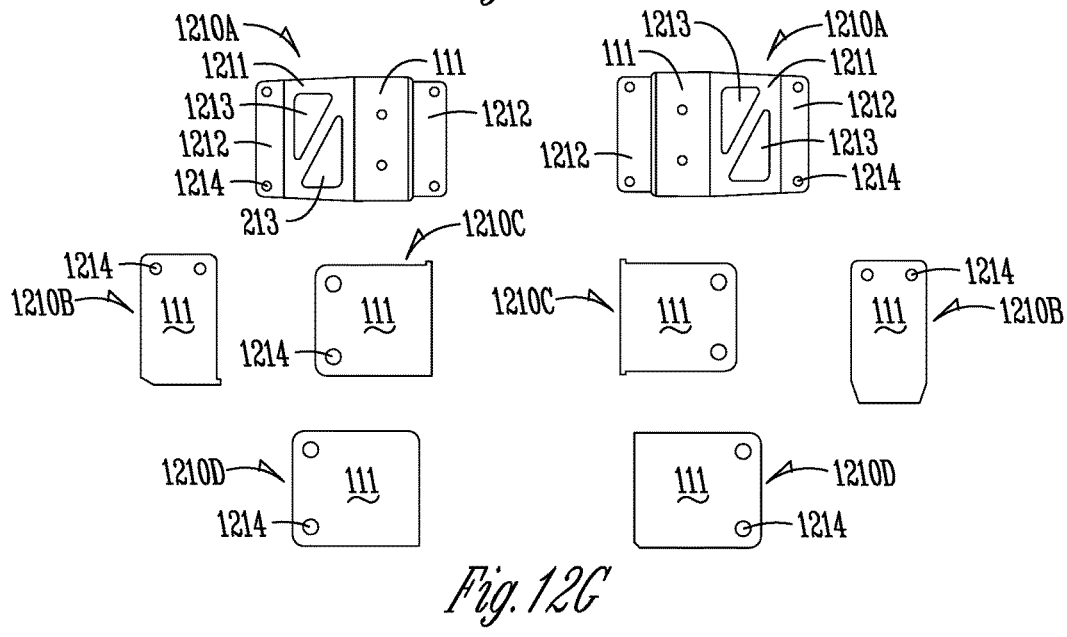

FIG. 12G, in particular, shows double flange side bracket(s) 1210A, single flange side bracket(s) 1210B, upper front bracket(s) 1210C, lower front bracket(s) 1210D, first bracket flange(s) 1211, second bracket flange(s) 1212, bracket cutout(s) 1213, and bracket hole(s) 1214, through which bolts and screws can be inserted.

Regarding a method of installation for the panels 1200A, 1200B, 1200C of this particular embodiment, exemplary and enumerated installation instructions follow:

1. gather the single flange side mounting brackets 1210B and the double flange side mounting brackets 1210A and then loosely assemble two 5/16" well nuts and two Philip's head screws onto each of these brackets 1210A-B (the HD Dodge Ram is equipped with 4 removable tie-down hooks that are fastened to the side of the bed 102, which can be removed using a 5 mm hex key);
2. install the single-flange brackets 1210B by placing them behind the two rear tie-downs, then fasten to the bed re-using factory hardware (closest to the tailgate 103);
3. install the double flange brackets 1210A by sandwiching them between the bedside and the tiedown hooks you just removed and behind the front tie-down hooks (closest to the cab 101);
4. gather the two front upper brackets 1210C, loosely assemble one 2⅜" long Allen head bolt, in-bed washer, and nut plate onto each of these brackets 1210C;
5. install the front upper bracket 1210C assemblies by inserting the nut plate into the slot located towards the top of each bed side (the nut plate will have to be inserted at an angle in order to fit), then orient the nut plate so that it is perpendicular and centered behind the slot and push the tabbed washer against the bed side so that the tabs fit into the slot (if aligned correctly, the tabs should prevent the nut plate from spinning), and while keeping the tabbed washer in the slot, pull back on the bolt and begin to tighten until snug;
6. optionally install extra flat brackets that can be mounted in the slots located above the wheel wells 109A and are fastened in place using the same method as the upper front brackets 1210C;
7. locate the two remaining front lower brackets 1210D and loosely assemble a 3/4-inch well nut and 1.5-inch long Allen head bolt onto each bracket 1210D, then install the lower bracket 1210D assemblies by inserting the well nut into the slot located just next to the forward tie-down hook before tightening the bolt using a 7/32 hex key until the well nut is snug in the slot;
8. prepare the front panel 1200A to be installed by threading a jam nut onto each of the rubber feet, then loosely screw the rubber feet into the riv-nuts located on the bottom flange of the front panel 1200A;
9. fasten all panels 1200A, 1200B, 1200C to the corresponding brackets 1210A-D using the provided Torx-head screws and a T30 Torx driver;
10. adjust the rubber feet on the front panel 1200A down until they are snug against the floor of the bed 102, then secure the rubber feet in place by tightening the jam nuts against the front plate 1200A using a 10 mm wrench; and
11. once all the panels 1200A, 1200B, 1200C are installed in the vehicle, ensure all fasteners are tightened until snug, but do not overtighten.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

List of Reference Characters

| | |
|---|---|
| 100 | modular lightweight load carrying equipment system for automobiles |
| 101 | cab |
| 102 | bed |
| 103 | tailgate |
| 104 | cable |
| 105 | sidewall |
| 106 | tail light |
| 107 | windows (e.g., windshield, passenger windows, back glass) |
| 108 | mirror(s) |
| 109A | wheel well |
| 109B | wheel (e.g., all-terrain tires) |
| 110 | panel |
| 111 | brackets for panels (including the bracket main body) |
| 112 | cargo |
| 113 | straps |
| 114 | clamps |
| 201 | mounting brackets step |
| 202 | attaching panels step |
| 203 | securing cargo step |
| 301 | clamp base |
| 302 | arm |
| 303 | teeth |
| 304 | notches |
| 305 | rectangular aperture |
| 306 | hole |
| 307 | washer plate |
| 308 | locking tab |
| 400A | front panel |
| 400B | passenger-side panel |
| 400C | driver-side panel |
| 401 | panel flange |
| 402 | flange hole |
| 403 | elongated slot |
| 404 | PALS-like grid |
| 405 | recessed surface |
| 406 | panel hole |
| 407 | splined edge |
| 408 | line of symmetry |
| 409 | substantially orthogonal angle |
| 410A | first front bracket |
| 410B | second front bracket |

TABLE 1-continued

List of Reference Characters

| | |
|---|---|
| 411 | first bracket flange |
| 412 | protruding surface |
| 413 | second bracket flange |
| 414 | bracket hole |
| 500A | front panel |
| 500B | driver-side panel |
| 500C | passenger-side panel |
| 501 | panel flange |
| 502 | flange hole |
| 503 | elongated slot |
| 504 | PALS-like grid |
| 506 | panel hole |
| 507 | splined edge |
| 508 | line of symmetry |
| 509 | panel cutout |
| 510A | side bracket |
| 510B | front bracket |
| 511 | bracket flange |
| 512 | protruding surface |
| 513 | bracket holes |
| 600A | front panel |
| 600B | driver-side panel |
| 600C | passenger-side panel |
| 602 | panel hole |
| 603 | elongated slot |
| 604 | PALS-like grid |
| 606 | edge cutout |
| 607 | splined edge |
| 608 | line of symmetry |
| 609 | panel cutout |
| 610A | front bracket |
| 610B | middle bracket |
| 610C | rear bracket |
| 611 | bracket flange |
| 612 | protruding surface |
| 614 | bracket holes |
| 615 | bracket cutout |
| 700A | front panel |
| 700B | first passenger-side panel |
| 700C | second passenger-side panel |
| 700D | first driver-side panel |
| 700E | second driver-side panel |
| 702 | panel hole |
| 703 | elongated slot |
| 704 | PALS-like grid |
| 706 | edge cutout |
| 707 | splined edge |
| 708 | line of symmetry |
| 709 | panel cutout |
| 710A | front upper bracket |
| 710B | rear bracket |
| 710C | front lower bracket |
| 710D | side bracket |
| 711 | bracket flange |
| 712 | protruding surface |
| 713 | bracket cutout |
| 714 | bracket holes |
| 800A | front panel |
| 800B | passenger-side panel |
| 800C | driver-side panel |
| 801 | panel flange |
| 802 | flange hole |
| 803 | elongated slot |
| 804 | PALS-like grid |
| 806 | panel hole |
| 807 | splined edge |
| 808 | line of symmetry |
| 809 | edge cutout(s) |
| 810 | bracket |
| 811 | bracket flange |
| 813 | bracket cutout |
| 814 | bracket holes |
| 900A | front panel |
| 900B | driver-side panel |
| 900C | passenger-side panel |
| 902 | panel hole |
| 903 | elongated slot |
| 904 | PALS-like grid |

TABLE 1-continued

List of Reference Characters

| | |
|---|---|
| 906 | edge cutout |
| 907 | splined edge |
| 908 | line of symmetry |
| 909 | panel cutout |
| 1000A | front panel |
| 1000B | driver-side panel |
| 1000C | passenger-side panel |
| 1002 | panel hole |
| 1003 | elongated slot |
| 1004 | PALS-like grid |
| 1006 | panel cutout |
| 1007 | splined edge |
| 1009 | orthogonal angle |
| 1010A | side bracket |
| 1010B | front bracket |
| 1011 | bracket flange |
| 1012 | bracket holes |
| 1100A | front panel |
| 1100B | driver-side panel |
| 1100C | passenger-side panel |
| 1102 | panel hole |
| 1103 | elongated slot |
| 1104 | PALS-like grid |
| 1106 | panel cutout (substantially rectangular with rounded corners) |
| 1107 | splined edge |
| 1108 | line of symmetry |
| 1110A | front upper bracket |
| 1110B | front lower bracket |
| 1110C | side mounting bracket (rear) |
| 1110D | first double flange side mounting bracket |
| 1110E | side mounting bracket (front) |
| 1110F | second double flange side mounting bracket |
| 1111 | bracket flange |
| 1112 | protruding surface |
| 1113 | edge protrusion |
| 1114 | bracket holes |
| 1200A | front panel |
| 1200B | driver-side panel |
| 1200C | passenger-side panel |
| 1202 | panel hole |
| 1203 | elongated slot |
| 1204 | PALS-like grid |
| 1206 | panel cutout (substantially rectangular with rounded corners) |
| 1207 | splined edge |
| 1208 | line of symmetry |
| 1209 | orthogonal angle |
| 1210A | double flange bracket |
| 1210B | single flange bracket |
| 1210C | front upper bracket |
| 1210D | front lower bracket |
| 1211 | first bracket flange |
| 1212 | second bracket flange |
| 1213 | bracket cutout (substantially triangular with rounded corners) |
| 1214 | bracket holes |

GLOSSARY

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The pouch attachment ladder system ("PALS") usually refers to a grid of webbing invented and patented by United States Army and is now found on a variety of tactical equipment. As used herein, PALS is used to refer to any object having a grid of holes arranged in rows, said grid having at least two rows of holes, unless context indicates otherwise.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

What is claimed is:

1. An interlocking attaching system for removably securing cargo to sidewalls of a truck bed of a pickup truck, said system comprising:
   panels comprising a PALS grid, said panels including at least a front panel, driver-side panel, and passenger-side panel;
   a plurality of mounting brackets that secure said panels to existing mount points within the sidewalls of the truck bed;
   a bolt;
   a washer;
   a nut plate;
   wherein the bolt, the washer, and the nut plate are assembleable in succession, wherein the nut plate is angleable behind an outer surface of the sidewalls, and wherein the bolt is tightenable until a position where a mounting bracket of the plurality of mounting brackets is secured in place;
   cargo; and
   fasteners for interlocking said cargo to the PALS grid of said panels, said fasteners including at least one strap and at least one clamp.

2. The interlocking attaching system of claim 1 wherein said fasteners further comprise at least one bracket.

3. The interlocking attaching system of claim 1 wherein said fasteners further comprise nylon ties.

4. The interlocking attaching system of claim 1 wherein at least a portion of a bottom edge of the driver-side panel or the passenger-side panel comprises a spline that corresponds to an upper edge of a wheel well of the truck.

5. The interlocking attaching system of claim 1 wherein the panels are coated with spray-on bed liners.

6. The interlocking attaching system of claim 1 wherein the front panel is symmetric about a vertical axis separating the driver-side and the passenger-side of the vehicle.

7. The interlocking attaching system of claim 1 wherein the panels provide clearance for factory tie downs and access to bedside outlets and lighting.

8. The interlocking attaching system of claim 1 wherein the panels include one or more cutouts in the panel that (1) avoid existing protrusions or obstructions in the sidewall of the truck bed or (2) permit access to electrical outlets or a wiring harness of the pickup truck.

9. The interlocking attaching system of claim 1 wherein the driver-side panel or the passenger-side panel comprises a duality of separate panels.

10. The interlocking attaching system of claim 1 wherein the panels comprise heavy gauge 1/10 inch thick 6000 series aluminum.

11. The interlocking attaching system of claim 1 wherein the panels are rated to carry a total weight of said cargo weighting at least two hundred pounds.

12. The interlocking attaching system of claim 1 wherein the panels are adapted to withstand temperatures between negative forty degrees and one hundred twenty degrees Fahrenheit.

13. The interlocking attaching system of claim 1 wherein the cargo is selected from the group consisting of weaponry, a spare battery, a tank for holding liquids, machinery, tools, equipment for construction or landscaping, and medical gear.

14. The interlocking attaching system of claim 1 wherein the at least one strap and the at least one clamp are made from a flexible, UV-resistant rubber.

15. A method of manufacturing the interlocking attaching system of claim 1 comprising customizing the panels to a make and model of the pickup truck.

16. A method of using the interlocking attaching system of claim 1 comprising:
   mounting the plurality of mounting brackets to the existing mount points;
   attaching the panels to said mounting brackets; and
   fastening cargo with the fasteners to said panels;
   wherein mounting said mounting brackets is accomplished by assembling the mounting brackets with the bolt, the washer, and the nut plate in succession, angling the nut plate such that the nut plate is behind an outer surface of the sidewalls, and tightening the bolt until the mounting plate is secured in place.

17. The method of claim 16 wherein the method is free from drilling or cutting.

18. The method of claim 16 further comprising removing covers to access said existing mount points.

19. The method of claim 16 further comprising locating the at least one strap and the at least one clamp at desirable locations on the PALS grid.

* * * * *